United States Patent
Nobuyasu et al.

(10) Patent No.: US 6,324,384 B1
(45) Date of Patent: Nov. 27, 2001

(54) CALL PROCESSING METHOD, SUBSCRIBER UNIT, AND ACCESS CONTROL APPARATUS OPERATED IN WIRELESS LOCAL LOOP SYSTEM

(75) Inventors: Kosuke Nobuyasu; Ryoichi Ishibashi, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/878,814

(22) Filed: Jun. 19, 1997

(30) Foreign Application Priority Data

Jul. 4, 1996 (JP) .................................................. 8-174885

(51) Int. Cl.[7] .................................................. H04B 1/40
(52) U.S. Cl. ..................... 455/74.1; 455/3.01; 455/401
(58) Field of Search ..................... 455/403, 509, 455/450, 455, 464, 565, 3.01, 74.1; 379/240, 241, 272, 273

(56) References Cited

U.S. PATENT DOCUMENTS

| | | | |
|---|---|---|---|
| 4,780,715 | * 10/1988 | Kasugai | 340/825.28 |
| 4,788,543 | * 11/1988 | Rubin | 340/825.4 |
| 5,386,417 | * 1/1995 | Daugherty et al. | 370/352 |
| 5,475,735 | * 12/1995 | Williams et al. | 455/403 |
| 5,535,260 | * 7/1996 | Zicker et al. | 455/584 |
| 5,574,977 | * 11/1996 | Joseph et al. | 455/450 |
| 5,666,364 | * 9/1997 | Pierce et al. | 370/455 |
| 5,678,188 | * 10/1997 | Hisamura | 455/509 |
| 5,689,557 | * 11/1997 | Kaplan | 379/35 |
| 5,799,254 | * 8/1998 | Karmi et al. | 455/528 |
| 5,812,651 | * 9/1998 | Kaplan | 379/200 |

FOREIGN PATENT DOCUMENTS

| | | |
|---|---|---|
| 54-028507 | 3/1979 | (JP) . |
| 58-207790 | 12/1983 | (JP) . |
| 60-112392 | 6/1985 | (JP) . |
| 60-177990 | 9/1985 | (JP) . |
| 01-122244 | 5/1989 | (JP) . |
| 03-107218 | 5/1991 | (JP) . |
| 04-082455 | 3/1992 | (JP) . |
| 05-244087 | 9/1993 | (JP) . |

* cited by examiner

Primary Examiner—Nay Maung
Assistant Examiner—Sonny Trinh
(74) Attorney, Agent, or Firm—Staas & Halsey LLP

(57) ABSTRACT

Call origination processing in a wireless local loop system, wherein a dial tone generating unit and a control unit thereof are provided in a subscriber terminal located in an access network between a user terminal and a local exchange and wherein a path connection forming unit, a VIP call processing unit, a pre-connected channel control unit and a radio channel establishing unit are provied in an access control apparatus located in the access network. By this, obstacles are prevented from occurring in the service of a VIP call.

34 Claims, 31 Drawing Sheets

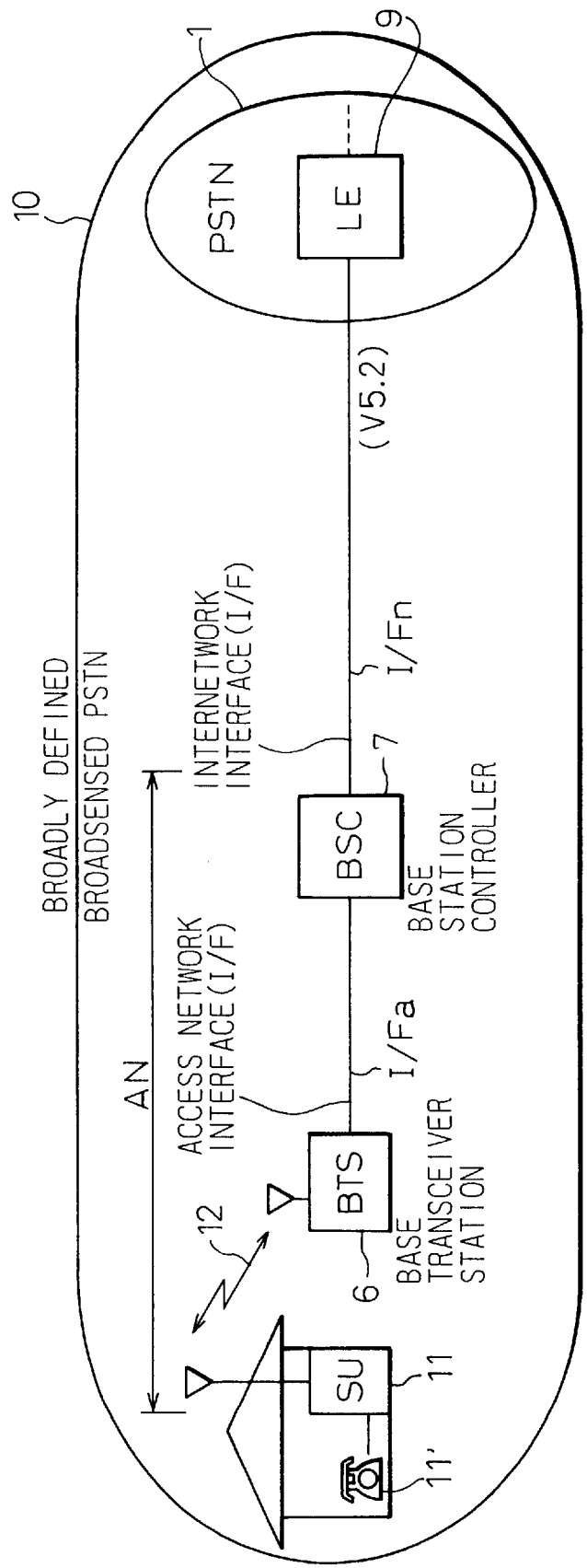

CALL PROCESSING METHOD, SUBSCRIBER UNIT, AND ACCESS CONTROL APPARATUS OPERATED IN WIRELESS LOCAL LOOP SYSTEM

BACKGROUND OF THE INVENTION

1. Field of the Invention

The present invention relates to a wireless local loop (WLL) system, more particularly relates to a call processing method, a subscriber unit, and an access control apparatus in an access network (AN) in a wireless local loop (WLL) system.

The wireless local loop (WLL) system is the system being most watched in the different types of access mode systems at the present and can be considered one of the leading means for connecting a local exchange (LE) and subscriber unit (SU) with a radio section interposed between them.

There are two leading means for concretely constructing such a wireless local loop (WLL) system: The first is to construct a wireless local loop (WLL) system by using a cellular network for mobile telephones as a base, while the second is to construct a wireless local loop (WLL) system by interposing a so-called "personal handy-phone" (PHS) system network. The wireless local loop (WLL) system referred to in the present invention may be any of the above structures. In this case, from the viewpoint that the first wireless local loop (WLL) system (cellular network) requires a mobile station controller (MSC) and therefore the compatibility with a public switched telephone network (PSTN) is not so good (explained later) and so on, the second wireless local loop (WLL) system (PHS network) is more preferred. Namely, when this second wireless local loop (WLL) system is used, it is easy to harmonize with the above-mentioned public switched telephone network (PSTN) and form a more broadly defined public switched telephone network (PSTN).

In such a more broadly defined public switched telephone network (PSTN), however, it is necessary to introduce an inter-network interface for connecting an access network (AN) including a subscriber unit (SU) and the public switched telephone network (PSTN) containing the local exchange (LE). As a concrete example of this inter-network interface, as will be mentioned later, there can be mentioned <1> the typical analog interface of a 2W (pair wire) type for accommodating general telephone (analog) signals and <2> a V5.2 (analog) interface according to V5.2 of the ITU-T recommendation. The explanation of the present invention given later is made by taking the latter V5.2 interface as an example.

2. Description of the Related Art

The wireless local loop (WLL) system to which the present invention is applied will be explained later in further detail by referring to the drawings. This wireless local loop (WLL) system forms a more broadly defined public switched telephone network (PSTN) by harmonizing with already existing public switched telephone networks (PSTN). Further, in this more broadly defined public switched telephone network (PSTN), an access network (AN) containing the wireless local loop (WLL) system is formed.

This access network (AN) contains, for example, a base transceiver station (BTS) connected to a subscriber unit (SU) provided with a user terminal (UT) such as a telephone set via a radio section and a base station controller (BSC) connected to the base transceiver station (BTS) via an access network interface (I/F).

In order to realize the above more broadly defined public switched telephone network (PSTN) as a practical network sufficiently satisfying user needs, there are a large number of problems which have to be solved. It is important to mainly solve four problems (1) to (4) among them. A detailed description will be made of these four problems (1) to (4) later. Simply mentioned, however, they are as follows.

Problem (1): When channel congestion etc. occur, it becomes impossible to even dial a number. This is a serious problem if the originating call is an emergency one etc.

Problem (2): Even if pre-connected channels are prepared, "very important phone (VIP) calls" of the V5.2 interface cannot be always guaranteed to get through.

Problem (3): At the time of channel congestion etc., not only when the originating call is a general call, but also when it is a "very important phone" (VIP) call, call origination from a user terminal (UT) is sometimes rejected.

Problem (4): Even if an assignment succeeds and a free time slot (TS) is provided for a user terminal (UT), if the user fails to capture a radio channel in the radio section in the wireless local loop (WLL) system, he will fail in connection in the radio section not only when the call is a general call, but also when it is a "very important phone" (VIP) call.

SUMMARY OF THE INVENTION

Accordingly, an object of the present invention is to provide a call processing method, a subscriber unit, and an access controlling apparatus in an access network (AN) in a wireless local loop (WLL) system, which can overcome the above four problems.

To attain the above object, the present invention is constituted as follows. Namely, a dial tone (DT) generating unit and a control unit thereof are provided in a subscriber terminal in an access network (AN) existing between the user terminal (UT) and a local exchange (LE). A path connection forming unit, a "very important phone" (VIP) call processing unit, a pre-connected channel control unit, and a radio channel establishing unit are provided in the access control apparatus in the access network (AN). Thus, in the call processing in the wireless local loop (WLL) system, an obstacle is prevented from occurring in the service of a "very important phone" (VIP) call.

BRIEF DESCRIPTION OF THE DRAWINGS

The above object and features of the present invention will be more apparent from the following description of the preferred embodiments with reference to the accompanying drawings, wherein:

FIG. 31 is a view of an example of the configuration of the wireless local loop (WLL) system to which the present invention is applied.

DESCRIPTION OF THE PREFERRED EMBODIMENTS

Before describing the embodiments of the present invention, the related art and the disadvantages therein will be described with reference to the related figures.

Figure 30:
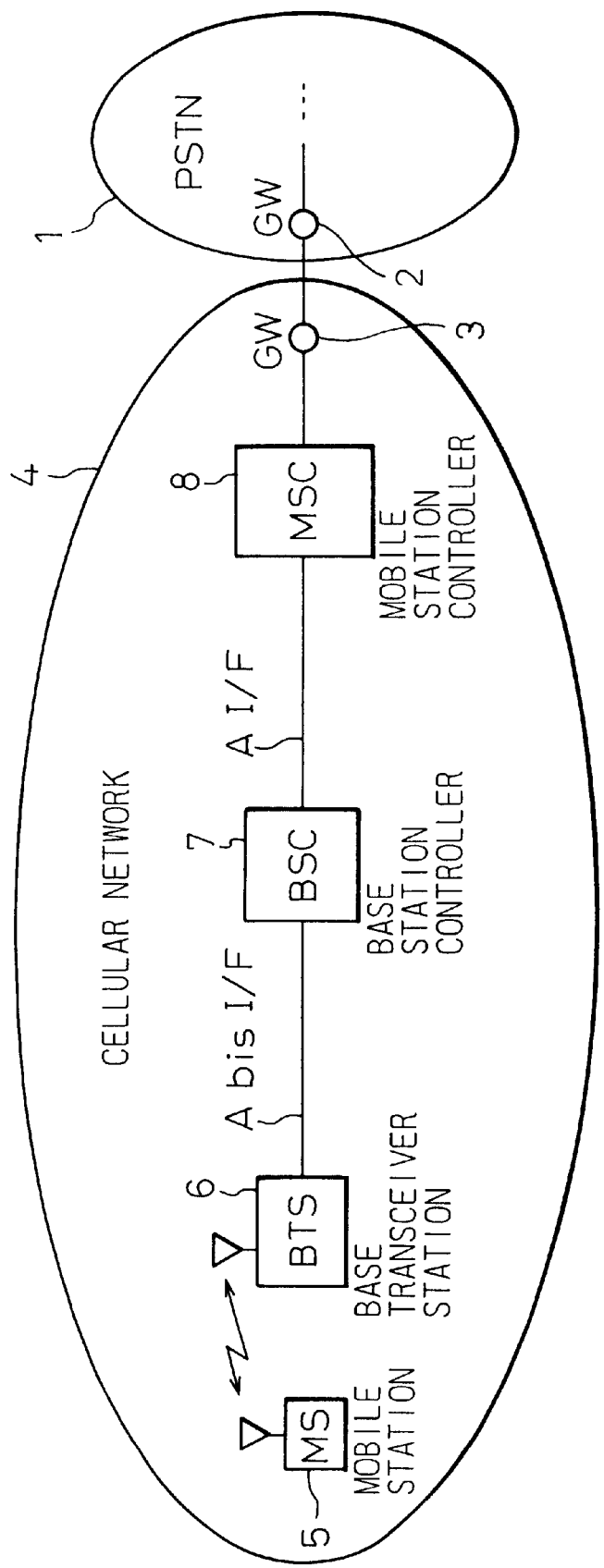
FIG. 30 is a view of the general configuration of a cellular network serving as the basis of a wireless local loop (WLL) system.

FIG. 30 is a view of the general configuration of a cellular network which serves as the basis of the wireless local loop (WLL) system. In the figure, reference numeral 4 denotes a cellular network. In the network 4, as illustrated, a mobile station (MS) 5, a base transceiver station (BTS) 6, a base station controller (BSC) 7, and an already mentioned mobile station controller (MSC) 8 are contained.

The cellular network 4 having the above configuration is connected to the public switched telephone network (PSTN) 1 via a gateway switch (GW) 3 and an opposing gateway switch (GW) 2. Note that, a local exchange (LE) is contained in the public switched telephone network (PSTN) 1.

In the already existing cellular network 4, an A-bis interface is adopted as the interface (I/F) between the base transceiver station (BTS) 6 and base station controller (BSC) 7, and an A-interface is adopted as the interface between the base station controller (BSC) 7 and the mobile station controller (MSC) 8.

FIG. 31 is a view of an example of the configuration of the wireless local loop (WLL) system to which the present invention is applied. In the figure, reference numeral 10 is a broadly defined public switched telephone network (PSTN) constituted by merging an already existing public switched telephone network (PSTN) 1 and a wireless local loop (WLL) system. The region of the access net network containing the wireless local loop (WLL) system is indicated by "AN" in the figure. In this access network (AN), in the illustrated example, a subscriber unit (SU) 11 provided with a user terminal (UT) 11' such as a telephone set, a base transceiver station (BTS) 6 connected to this subscriber unit (SU) 11 via a radio section 12, and a base station controller (BSC) 7 connected to the base transceiver station (BTS) 6 via the in-access network interface (I/F) I/Fa are contained. Here, the interface I/Fa is an interface which can be uniquely designed by the manufacturer.

For the connection of the subscriber unit (SU) 11 in the access network (AN) and the local exchange (LE) 9 in the public switched telephone network (PSTN) 1, further an inter-network interface (I/F) I/Fn is interposed as an open interface. As this inter-network interface I/Fn, as already mentioned, it is practical to adopt <1> the 2W analog interface and <2> V5.2 (analog) interface. In the present invention, a description will be made of an example using the latter V5.2 (analog) interface. The reason for this is as follows.

In recent years, the number of subscribers (11) accommodated in each local exchange (LE) 9 in public switched telephone networks (PSTN) 1 has been rising considerably and, at the same time, the services offered to the subscribers have become far more diverse. Therefore, as the inter-network interface I/Fn, an interface having high line concentration effect is demanded. In order to sufficiently respond to such a demand, the above V5.2 (analog) interface is preferred.

In order to realize the broadly defined public switched telephone network (PSTN) 10 having the configuration shown in FIG. 31 as a more practical network sufficiently satisfying user needs, there are a large number of problems which have to be solved. It is important to mainly solve the already briefly mentioned four problems (1) to (4) among them. Below, a detailed explanation will be given of these problems.

Problem (1)

By using a V5.2 interface, as will be explained in detail later, the process automatically proceeds up to the step called "allocation" in the sequence under the V5.2 interface by just the user activating the terminal (taking it "off the hook" so to speak). This "allocation" means the transfer of a message allocating of a free time slot among a plurality of time slots (TS) to the subscriber requesting call origination from the local exchange (LE) 9 to the access network (AN) under a time division multiple access (TDMA) method.

Here, assume that the allocation could not be completed due to for example channel congestion. That is, assume the assignment fails. In this case, by a V5.2 interface, the dial tone (DT) from the local exchange (LE) 9 is also disconnected (DISC) without being returned to the subscriber terminal. Consequently, the subscriber line is not activated. That is, a path connection cannot be formed. Accordingly, it becomes impossible to perform even dialing.

Then, finally, a busy tone (BT) generated by for example the access network (AN) itself is sent to the subscriber terminal to prompt the user to deactivate the terminal ("hang it up" so to speak), i.e., on hook.

In the end, from the subscriber's point of view, he or she experiences a situation where a busy tone (BT) is received without even receiving dial tone (DT) after activating the terminal—something impossible in general call origination processing. Further, he or she does not even receive information about why such a situation has occurred from the local exchange (LE) 9. This poses a serious problem in the case where the originating call is an emergency call such as "911" or a high traffic call (including "very important phone" (VIP) calls). This is the problem (1).

Problem (2)

By using a V5.2 interface, a facility has been proposed where a particular channel is pre-connected between a local exchange (LE) and an access network (AN) for "very important phone" (VIP) calls. For example, also the above emergency call is one of such "very important phone" (VIP) calls.

However, if a situation corresponding to the above problem (1) occurs, even if the originating call from the subscriber is a "very important phone" (VIP) call, it is not possible to even dial the number.

In the final analysis, even if a pre-connected channel is prepared, it is not possible to completely guarantee that a "very important phone" (VIP) call can get through by the V5.2 interface. This is the problem (2).

Problem (3)

Next, viewing the wireless local loop (WLL) system of FIG. 31 adopting the above V5.2 interface as the inter-network interface I/Fn, a problem of failure in call origination corresponding to the above problem (1) similarly occurs.

Namely, in FIG. 31, even if the user terminal (UT) 11' is activated, if the allocation cannot be completed due to channel congestion, even the dial tone (DT) cannot be returned to the subscriber concerned. Accordingly, even if a pre-connected channel is prepared between the access network (AN) and the local exchange (LE), it is not possible for the subscriber to dial the number, therefore the call origination from the user terminal (UT) 11' is rejected not only when the call is a general call, but also when it is a "very important phone" (VIP) call. This is the problem (3).

Problem (4)

In the wireless local loop (WLL) system shown in FIG. 31, a radio section 12 is contained in the access network (AN). In this radio section 12, line concentration for sharing as small a number of radio channels as possible is carried out. For this reason, by the V5.2 interface, even if the above assignment succeeds and a free time slot (TS) is provided for the user terminal (UT) 11' by the allocation, if the user terminal (UT) 11' fails to capture a radio channel in that radio section 12, it will fail in connection in the radio section 12 not only when the call is a general call, but also when it is a "very important phone" (VIP) call. This is the problem (4).

Note that it is also important to deal with overflows of general calls along with dealing with "very important phone" (VIP) calls as explained above.

Accordingly, the present invention provides a call processing method, a subscriber unit 11, and an access control apparatus in the access network (AN) in a wireless local loop (WLL) system which can solve the above four problems.

Figure 1:
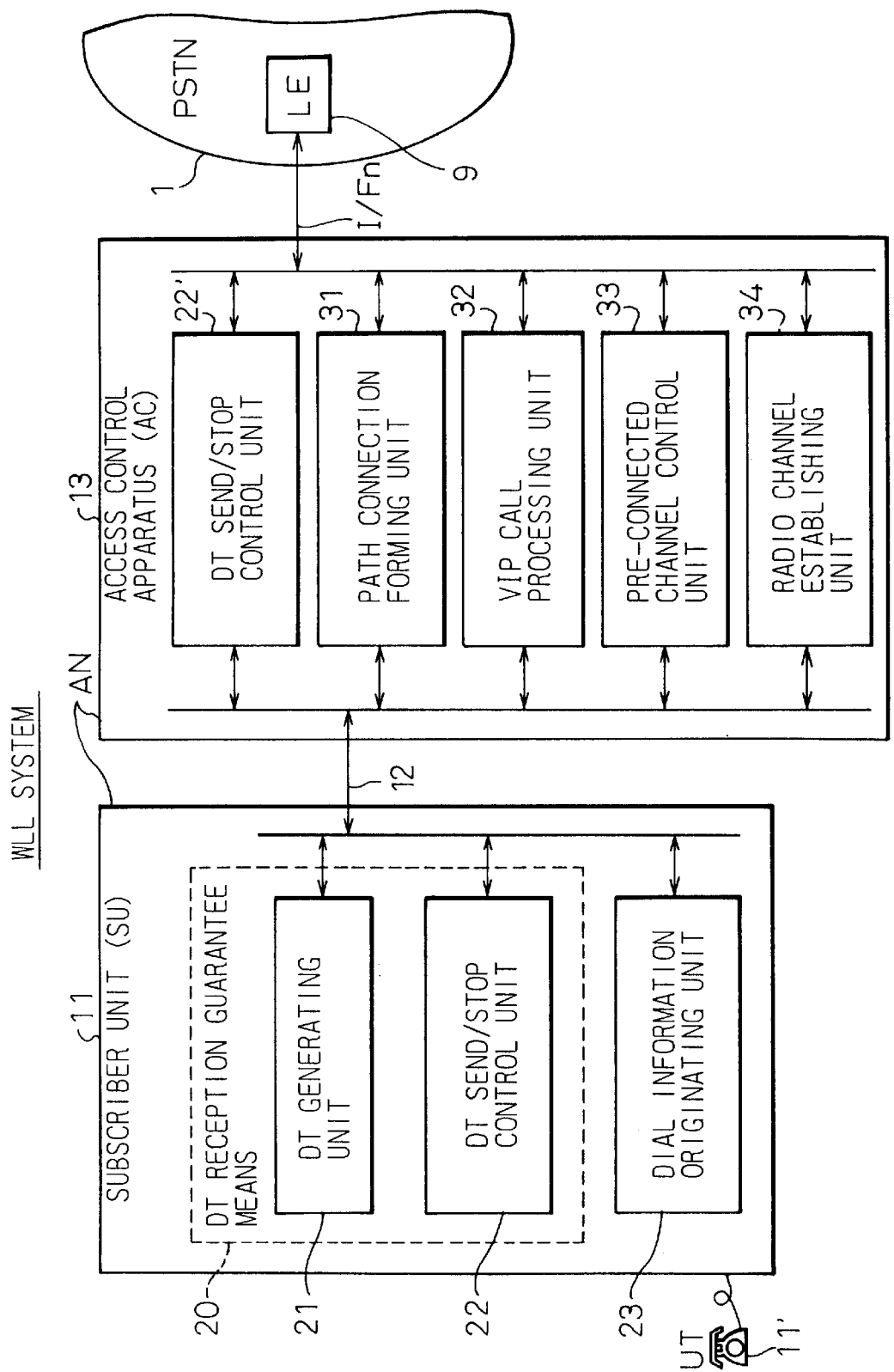
FIG. 1 is a view of the general concept of a wireless local loop (WLL) system proposed by the present invention.

FIG. 1 is a view of the general concept of a wireless local loop (WLL) system proposed by the present invention. In the figure, AN is the access network mentioned before. The access network (AN) is mainly constituted by an access control apparatus 13 and a subscriber unit (SU) 11 provided with a user terminal (UT) 11'. Here, referring to FIG. 31, the access control apparatus 13 is an apparatus handling the facilities possessed by for example the base transceiver station (BTS) 6 and the base station controller (BSC) 7, particularly the facilities possessed by the latter base station controller (BSC) 7. The user terminal (UT) 11' transmits and receives information such as voice information with the local exchange (LE) 9 in the public switched telephone network (PSTN) 1 via the subscriber unit (SU) 11, the above access control apparatus (AC) 13, and inter-network interface I/Fn.

As shown in the figure, the facilities proposed in the present invention are as follows. Note that, these facilities can be realized mainly by hardware or mainly by software or by a mixture of the hardware and software.

First, in the subscriber unit (SU) 11, a dial tone (DT) reception guarantee means 20 is provided. The means 20 can be realized by a dial tone (DT) generating unit 21 and a dial tone (DT) send/stop control unit 22 as a concrete example. In this subscriber unit (SU) 11, further a dial information origination unit 23 is provided.

Next, when viewing the access control apparatus (AC) 13, in the access control apparatus (AC) 13, a dial tone (DT) send/stop control unit 22' is provided. This dial tone (DT) send/stop control unit 22' may be alternatively provided together with the dial tone (DT) send/stop control unit 22 provided in the subscriber unit (SU) 11. For example, if the dial tone (DT) send/stop unit is provided in the access control apparatus (AC) 13 (22'), it is not necessary to provide the dial tone (DT) send/stop control unit 22 in the subscriber unit (SU) 11. This does not, however, prohibit the provision of the same in both of the subscriber unit (SU) 11 and access control apparatus (AC) 13.

This access control apparatus (AC) 13 is further provided with a path connection forming unit 31 which forms a voice channel up to the subscriber unit (SU) 11.

Further, a "very important phone" (VIP) call processing unit 32 is provided. When the originating call from the user terminal (UT) 11' is a "very important phone" (VIP) call, it is processed with priority and the rejection of the origination thereof is prevented.

Further, a pre-connected channel control unit 33 is provided. By this, capture of a channel of a "very important phone" (VIP) call or high efficient traffic is realized.

Further, a radio channel establishing unit 34 is provided. By this, even if the traffic in the radio section 12 is congested, a connection for particularly a "very important phone" (VIP) call is secured.

Figure 2:
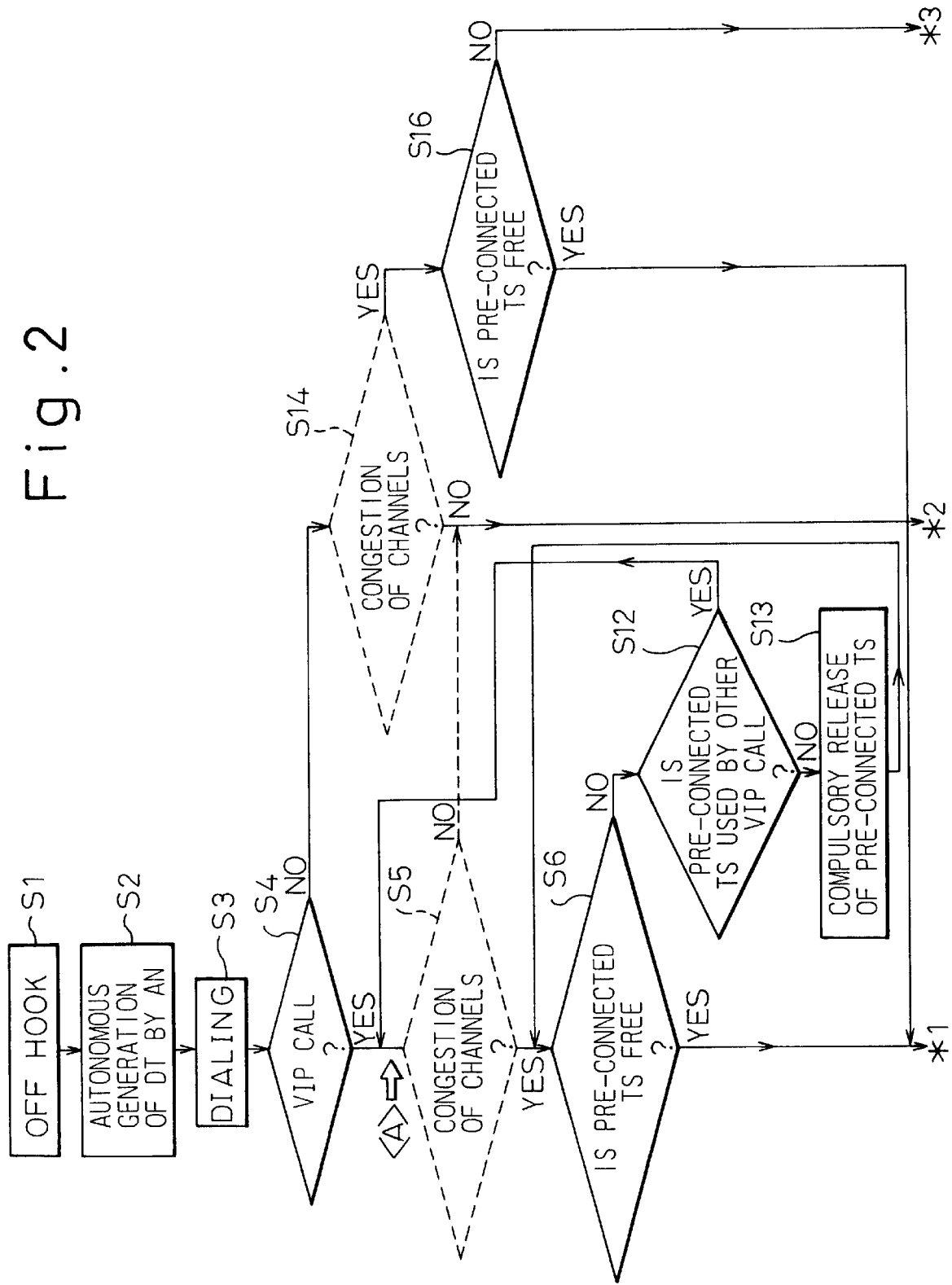
FIG. 2 is a first part of a flowchart of the general concept of a call processing method proposed in the present invention.
Figure 3:
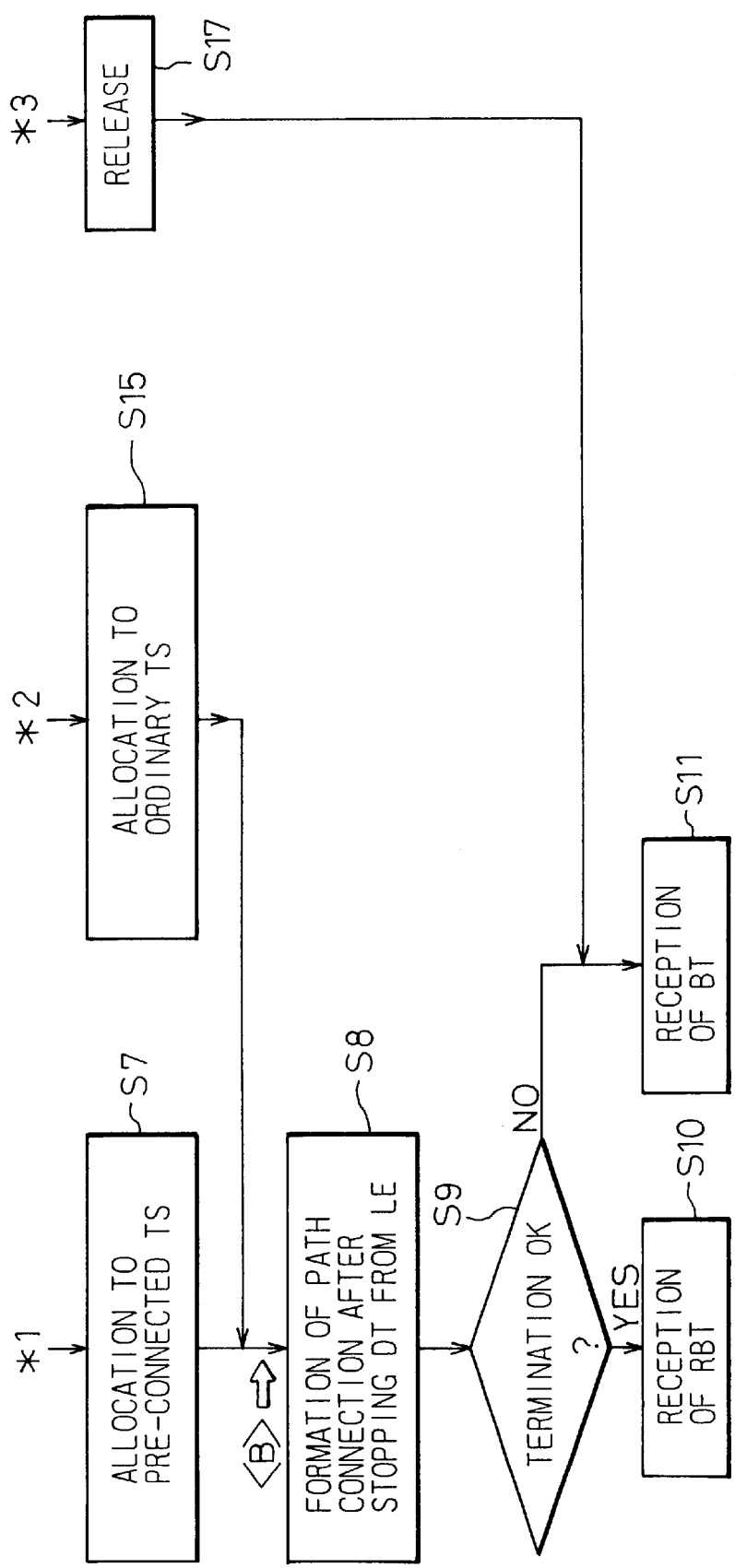
FIG. 3 is a second part of a flowchart of the general concept of a call processing method proposed in the present invention.

FIG. 2 and FIG. 3 are first and second parts of a flowchart showing the overall concept of the call processing method proposed in the present invention.

Figure 4:
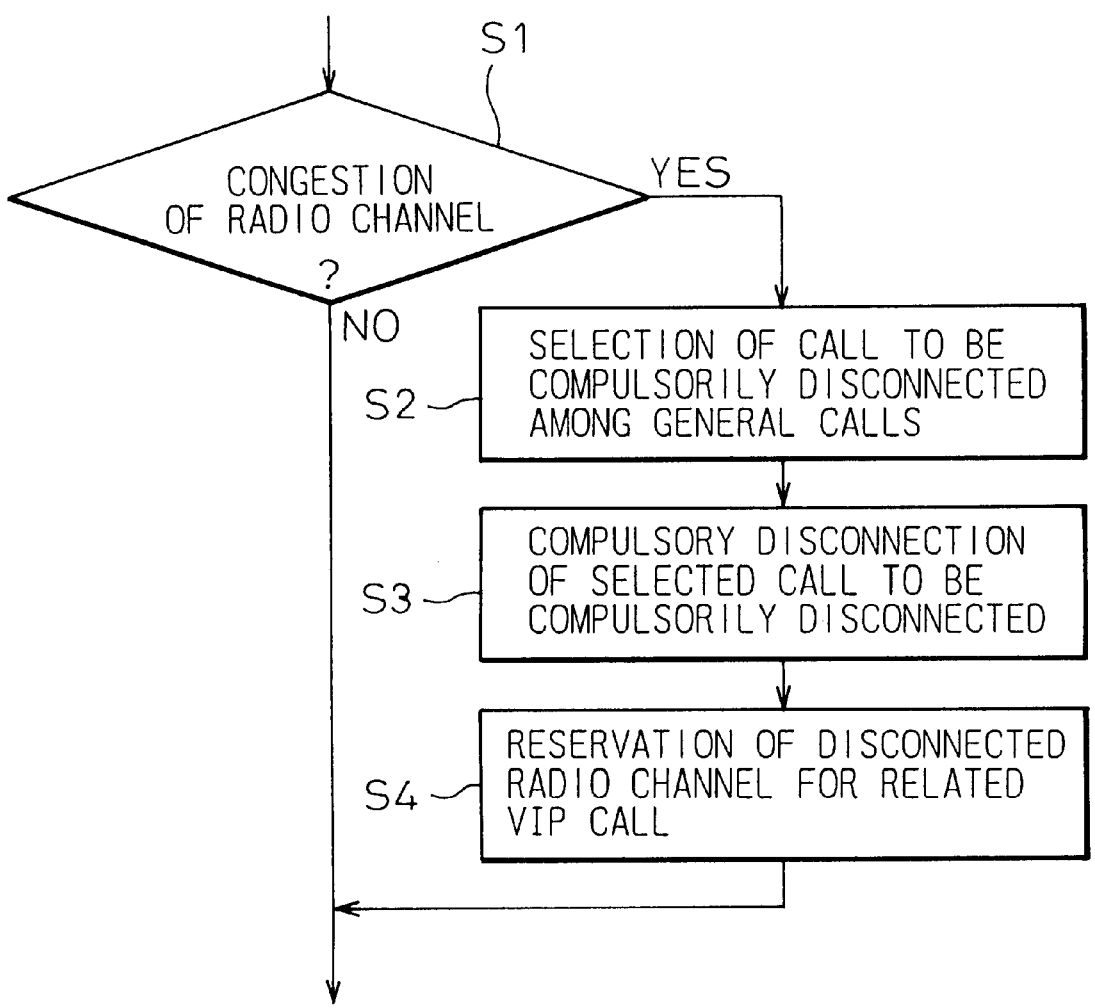
FIG. 4 is an additional part to the flowcharts of FIG. 2 and FIG. 3.

FIG. 4 is an additional flowchart for FIG. 2 and FIG. 3.

First, FIG. 2 and FIG. 3 will be referred to.

Step S1 (FIG. 2): The subscriber activates the user terminal (UT) 11' ("takes it off the hook").

Step S2: The access network (AN) autonomously generates the dial tone (DT) (not from the local exchange (LE) 9). In FIG. 1, the dial tone (DT) generating unit 21 in the subscriber unit (SU) 11 generates the dial tone (DT).

Step S3: The user confirms the dial tone (DT) and dials the call destination.

Step S4: It is determined whether or not the related call is a "very important phone" (VIP) call. This is carried out by the "very important phone" (VIP) call processing unit 32 of FIG. 1.

Step S5: When it is determined that the related call is a "very important phone" (VIP) call at step S4, it is determined whether or not the channels are congested. When they are not congested (no), the process enters the "no" path of step S14. Namely, if the channels are not congested, even if the related call is a "very important phone" (VIP) call, a time slot (TS) of a general call is allocated.

When the determination at step S5 is yes (channels are congested), the process proceeds to step S6.

Note that, the present step S5 is an option and is not an indispensable step in the present invention. Accordingly, it is also possible to pass over the present step S5.

Step S6: When it is determined that the channels are congested at step S5 (yes), it is investigated if the time slot (TS) for the pre-connected channel (CH) is free.

Step S7 (FIG. 3): When it is determined that the time slot is free at step S6 (yes), the time slot (TS) for the pre-connected channel (CH) is allocated for the originating call from the user.

Step S8: After the dial tone (DT) from the local exchange (LE) 9 stops, the path connection is formed. This path connection is formed from the access control apparatus (AC) 13, for example, base station controller (BSC) 7, to the subscriber unit (SU) 11.

The path connection was formed after the dial tone (DT) from the local exchange (LE) 9 stops because the access network (AN) autonomously generates the dial tone (DT) (S2), therefore this dial tone (DT) and the dial tone (DT) from the local exchange (LE)9 are prevented from being heard in duplicate by the user.

Step S9: It is confirmed if the path up to the call destination has successfully be set up at the local exchange (LE) 9 in the public switched telephone network (PSTN) 1 (Terminate OK?). If the path was set up (yes), a ringback tone (RBT) from the local exchange (LE) 9 side is received at the user terminal (UT) 11'.

Thereafter, when the opposing party activates his or her terminal ("takes it off the hook"), i.e., off hook, the conversation is started.

Step S10: When the path has failed to be set up (no) at step S9, a busy tone (BT) is received at the user terminal (UT) 11'. Note that, this busy tone (BT) can be returned from the access control apparatus (AC) 13.

Step S12 (FIG. 2): When it is determined at step S6 that there is no free time slot (TS) for the pre-connected channel (CH) (no), it is investigated whether the time slots (TS) for the pre-connected channel (CH) are in use by general calls or the time slots (TS) are in use by "very important phone" (VIP) calls originated from other users.

Step S13: When it is found that a time slot (TS) of the pre-connected channel (CH) is being used by a general call and not by a "very important phone" (VIP) call of another user by the investigation at step S12, the time slot (TS) of the pre-connected channel (CH) used by the general call is compulsorily released and then the process returns to step S6. At this time, the determination at step S6 becomes "yes".

Step S14: When it is found that the related originating call is not a "very important phone" (VIP) call by the determination at step S4, it is investigated if the channels are congested. (NIHONBUN GA MACHIGATTE IMASUKA?)

Step S15 (FIG. 3): When it is found that the channels are not congested by the investigation at step S14 (no), an ordinary time slot (TS) is allocated for the general call from the user terminal (UT) 11', that is, a time slot (TS) other than a time slot (TS) for the preconnected channel (CH).

The process after this proceeds to the already mentioned step S8 and subsequent steps.

Step S16: When it is found that the channels are congested by the investigation at step S14 (yes), a determination similar to that at step S6 is carried out. Note that, this determination can be carried out at the pre-connected channel control unit 33 in the access control apparatus (AC) 13 shown in FIG. 1 (true also for step S6).

Step S17 (FIG. 3): If it is found from the above determination that the pre-connected time slot (TS) does not exist (no), the related call processing is released.

Then, a busy tone (BT) is sent to the user (step S11).

Next, FIG. 4 will be referred to. The flowchart of the figure shows the processing for dealing with the final problem (4) mentioned above and is aimed at the capture of a radio channel in the radio section 12 shown in FIG. 31. Note that, the flow of processing of the present figure is inserted into the part of <A> of FIG. 2 or the part of <B> of FIG. 3.

Step S1: it is investigated if the radio channel is in congestion. If it is not in congestion (no), the process returns to the processing flow of FIG. 2 and FIG. 3.

Step S2: When it is determined that the channels are congested at step S1, the process enters into the present step S2. Here, a call which should be compulsorily disconnected is selected from among a plurality of general calls irrespective of the intention of the user. A description will be made later of the criteria for this selection.

Step S3: The general call to be disconnected compulsorily, selected at step S2, is compulsorily disconnected.

Step S4: The radio channel occupied by the general call disconnected at step S3 is reserved for the "very important phone" (VIP) call which could not capture a radio channel due to congestion.

By this, a "very important phone" (VIP) call generated when radio channels area congested can be relieved. Note that the flow of processing of FIG. 4 is executed by the radio channel establishing unit 34 in the access control apparatus (AC) 13 of FIG. 1. It is also, however, possible to make the local exchange (LE) 9 in public switched telephone network (PSTN) 1 perform similar processing if necessary.

Below, a detailed description will be made of embodiments of the present invention, but before this, an explanation will be made of the well known V5.2 interface adopted as the inter-network interface (I/Fn) in a preferred example in the present invention.

Figure 5:
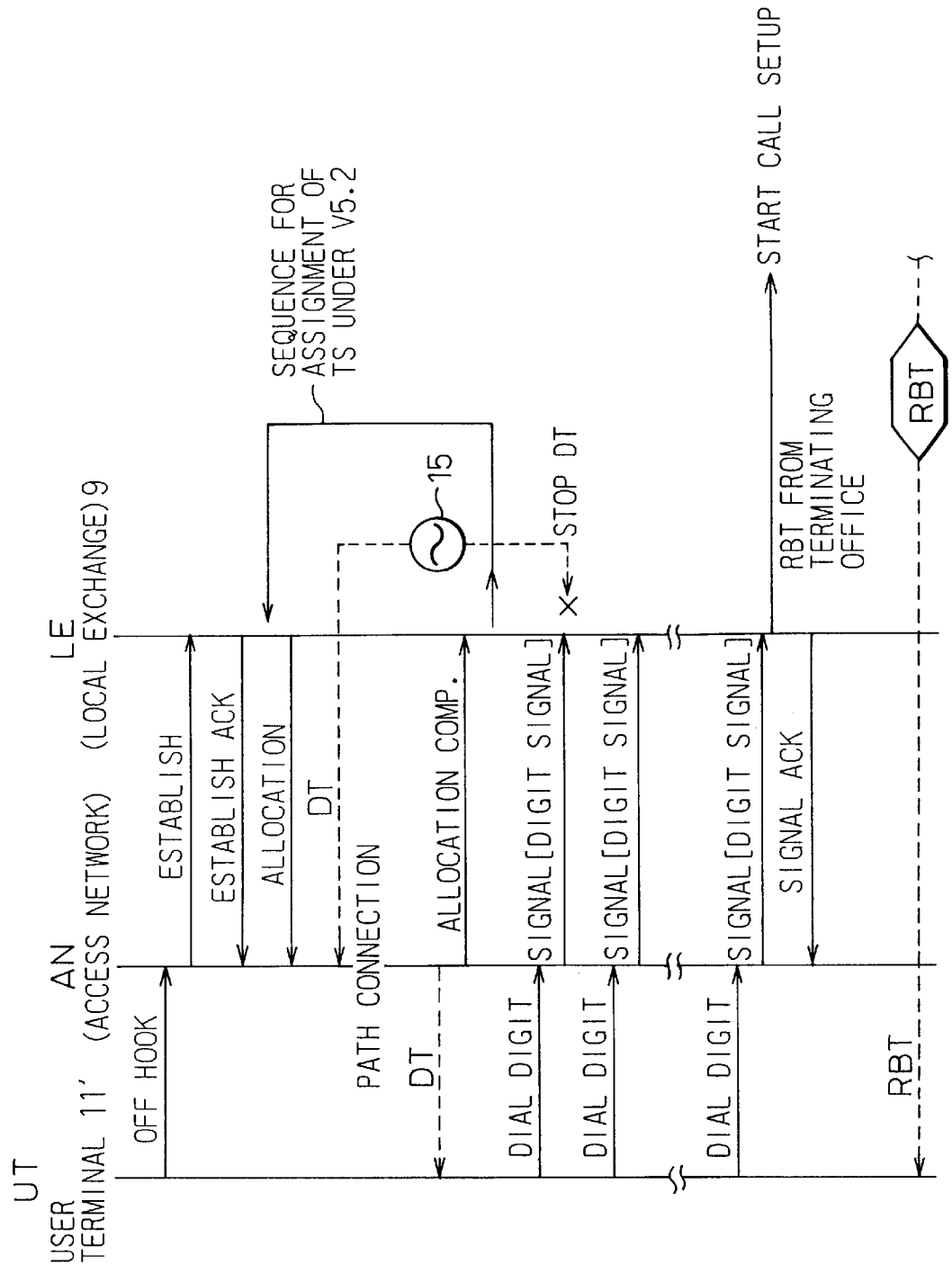
FIG. 5 is a sequence diagram of the call origination in a well known V5.2 (analog) interface.

FIG. 5 is a sequence diagram of call origination in a well known V5.2 (analog) interface. The parts related to the call origination sequence of the present figure are the user terminal (UT) 11', the access network (AN), and the local exchange (LE) 9 shown in FIG. 31.

First, when the subscriber activates, i.e., off hook, the user terminal (UT), the access network (AN) receiving this originates a command for requesting a connection (ESTABLISH) to the local exchange (LE). The local exchange (LE) receiving this returns an acknowledgement (ESTABLISH ACK) thereof to the access network (AN). After this, an allocation command is sent to the access network (AN). Here, an assignment sequence for the time slot (TS) under the V5.2 interface is started. At this time, the dial tone (DT) is sent to access network (AN) by a tone trunk 15 inside the local exchange (LE). This dial tone (DT) is sent not through the control channel, but through the voice channel, and accordingly it will be represented by the dotted route in the figure.

The access network (AN) accepts the allocation command and sets up the voice channel up to the user terminal (UT). This is carried out by the path connection processing in the figure.

The dial tone (DT) first reaches the user terminal (UT) when this path connection is successful. Here, the "allocation complete" (ALLOCATION COMP) status is exhibited, and the assignment sequence is ended.

On the other hand, the user at the user terminal (UT) hears the dial tone (DT) and subsequently starts to dial the call destination. The dial number thereof is transmitted to the access network (AN) as dial digits. The access network (AN) receiving this transfers a signal message (SIGNAL) such as a digit signal to the local exchange (LE). This operation is sequentially carried out for every dial number. Note that, the dial tone (DT) stops when receiving the first signal message (SIGNAL) (stop DT). When the transfer of the signal message (SIGNAL) up to the last digit is ended, the local exchange (LE) starts the operation for setting up the call toward the related opposing exchange (not illustrated) (start call setup). Then, when the ringup at the opposing user terminal (UT) is started, the local exchange (LE) returns the acknowledgement of the signal message (SIGNAL) to the access network (AN) (SIGNAL ACK). Then, the user (UT) receives the ringback tone (RBT) from the opposing local exchange (i.e., terminating office) through the voice channel which has been already set up by the path connection.

Figure 6:
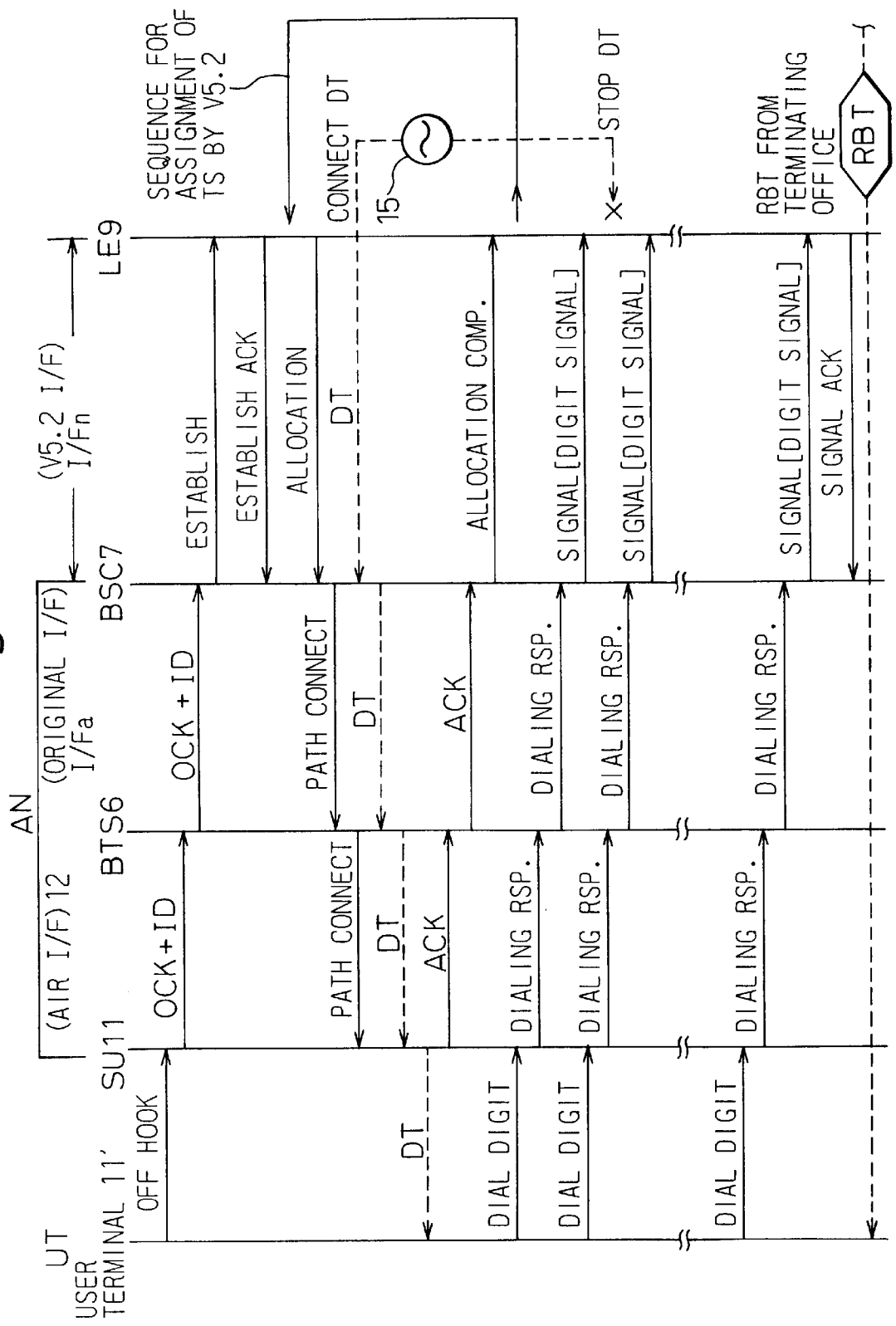
FIG. 6 is a sequence diagram of the call origination in the wireless local loop (WLL) system of FIG. 31.

FIG. 6 is a sequence diagram of a call origination in the wireless local loop (WLL) system of FIG. 31, particularly, a call origination sequence adopting the V5.2 interface. The method of viewing the figure is similar to the case of FIG. 5 mentioned above, but in the case of the present figure, the part of the access network (AN) is further finely broken down according to FIG. 31. Namely, it is segmented into the subscriber unit (SU) 11, the base transceiver station (BTS) 6, and the base station controller (BSC) 7. Between them, an interface Air I/F for the radio section 12 and an interface I/Fa inside access network as the original interface of the manufacturer are interposed.

An explanation will be made next of the sequence of FIG. 6 below, but explanations of part similar to those of the sequence of FIG. 5 will be omitted.

When the user activates, i.e., off hook, the user terminal (UT) 11', the subscriber unit (SU) 11 transfers a command composed of the off hook (OCK) status and the identification (ID) of the related user to the base station controller (BSC) 7 via the base transceiver station (BTS) 6. The base station controller (BSC) 7 receiving this starts a processing sequence similar to that shown in FIG. 5 and enters into the assignment sequence. During this assignment sequence, when a dial tone (DT) directed to the user terminal (UT) 11' is relayed by the subscriber unit (SU) 11, the subscriber unit (SU) 11 returns the acknowledgement (ACK) thereof to the base station controller (BSC) 7, and further the base station controller (BSC) 7 originates an allocation complete (ALLOCATION COMP) message to the local exchange (LE) 9.

After the allocation is completed, the user terminal (UT) sequentially sends the dial number as dial digits for every digit. Each dial digit is translated into a dialing response (Rsp) message at the subscriber unit (SU) 11 and further reaches the base station controller (BSC) 7 via the base transceiver station (BTS) 6, where it is retranslated to the signal message (SIGNAL) (digital signal) and transferred to the local exchange (LE) 9. The rest of the processing is the same as the case of FIG. 5.

In the wireless local loop (WLL) system, by interposing the inter-network interface (V5.2 interface) shown in FIG. 5 and FIG. 6, the four problems (1) to (4) mentioned above occur. Among these problems, the problems (1), (3), and (4) will be explained by referring to the drawings for a further easier understanding.

Figure 7:
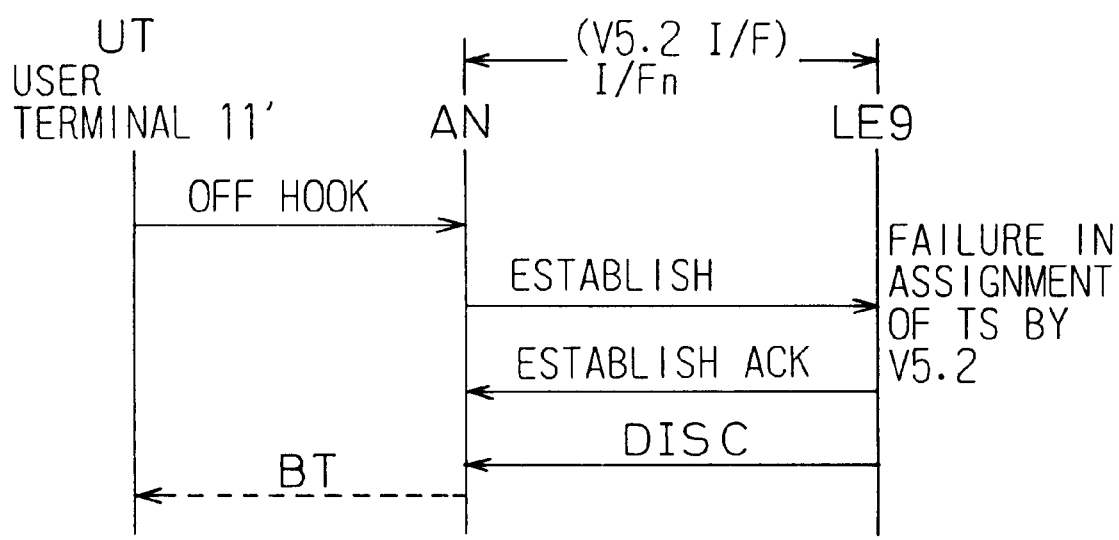
FIG. 7 is a sequence diagram showing the situation of occurrence of the problem (1)

FIG. 7 is a sequence diagram showing a situation of occurrence of the problem (1). In the above problem (1), when the subscriber line cannot be activated (path connection of FIGS. 5 and 6 cannot be formed) due to channel congestion and the allocation is not completed (ALLOCATION COMP.), a disconnection (DISC) signal is returned from the local exchange (LE) 9 side. In the end, the user terminal (UT) cannot even hear a dial tone (DT) and fails in origination of the call.

FIG. 7 shows the above sequence in which a call origination failed. A busy tone (BT) is suddenly returned without the user even hearing the dial tone (DT).

Figure 8:
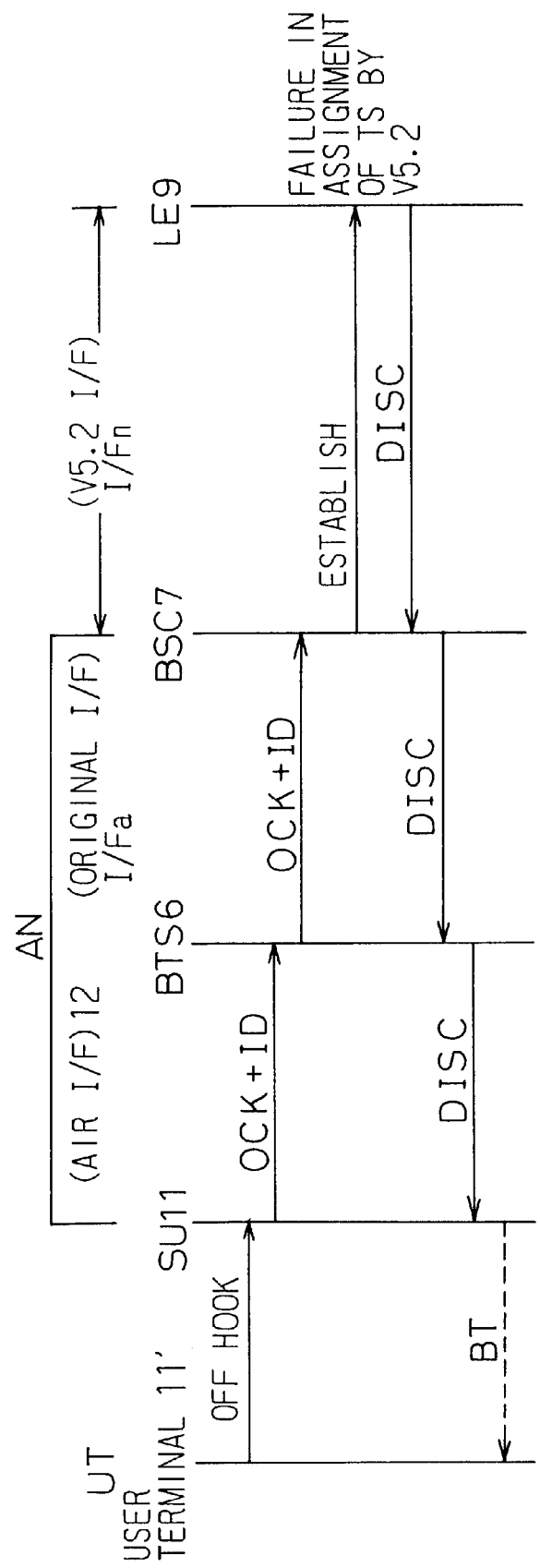
FIG. 8 is a sequence diagram showing the situation of occurrence of the problem (3)

FIG. 8 is a sequence diagram showing a situation of occurrence of the problem (3). The above problem (3) is that even if an originating call from the user terminal (UT) 11' is a "very important phone" (VIP) call, at the time of channel congestion, the origination is rejected without returning the dial tone (DT) to the user.

In FIG. 8, even if a pre-connected channel (CH) is prepared between the access network (AN) and local exchange (LE) 9, at the time of channel congestion, and therefore even if the related call is a "very important phone" (VIP) call, it is disconnected (DISC) without reaching the allocation complete (ALLOCATION COMP) state. During this time, the busy tone (BT) is returned without the user even hearing the dial tone (DT).

Figure 9:
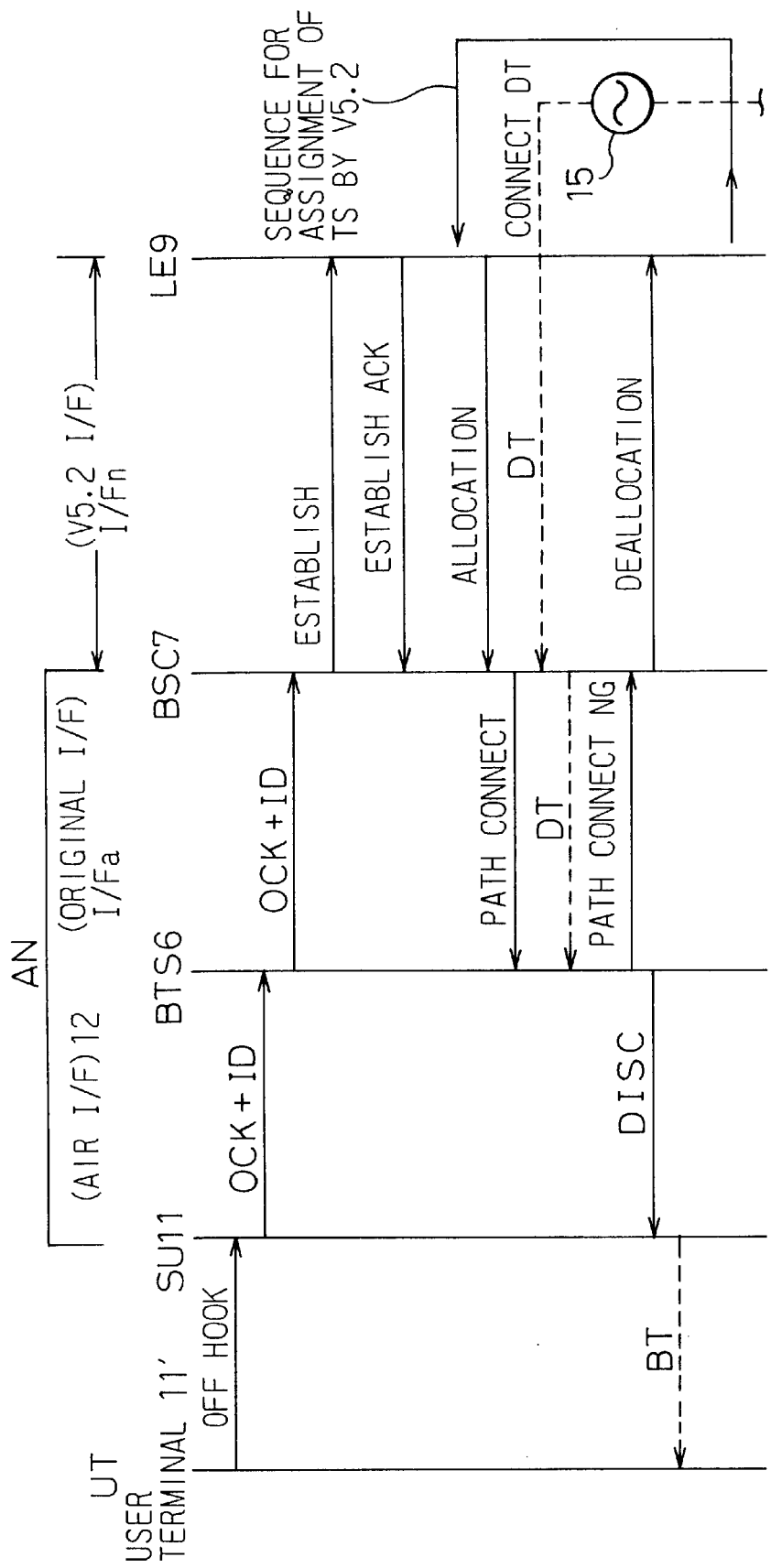
FIG. 9 is a sequence diagram showing the situation of occurrence of the problem (4)

FIG. 9 is a sequence diagram showing a situation where the problem (4) occurs. The above problem (4) resides in that even if the allocation of the time slot (TS) is completed by the originating call (off hook) from the user terminal (UT) 11' and the assignment succeeded, the call origination fails in the end if there is channel congestion in the radio section 12.

Referring to FIG. 9, while the path connection was formed between the base transceiver station (BTS) 6 in the access network (AN) and the local exchange (LE) 9, a radio channel cannot be captured in the radio section 12 on the user side from the base transceiver station (BTS) 6, so disconnection (DISC) is caused and a busy tone (BT) is returned to the user.

At this time, in the end, the path connection fails and a message "path connection NG" is transferred from the base transceiver station (BTS) 6 to the base station controller (BSC) 7. By using the interface I/Fn, the deallocation message indicative of a request for disconnection is transferred to the local exchange (LE) 9. Here, the once established ALLOCATION is released.

Figure 10:
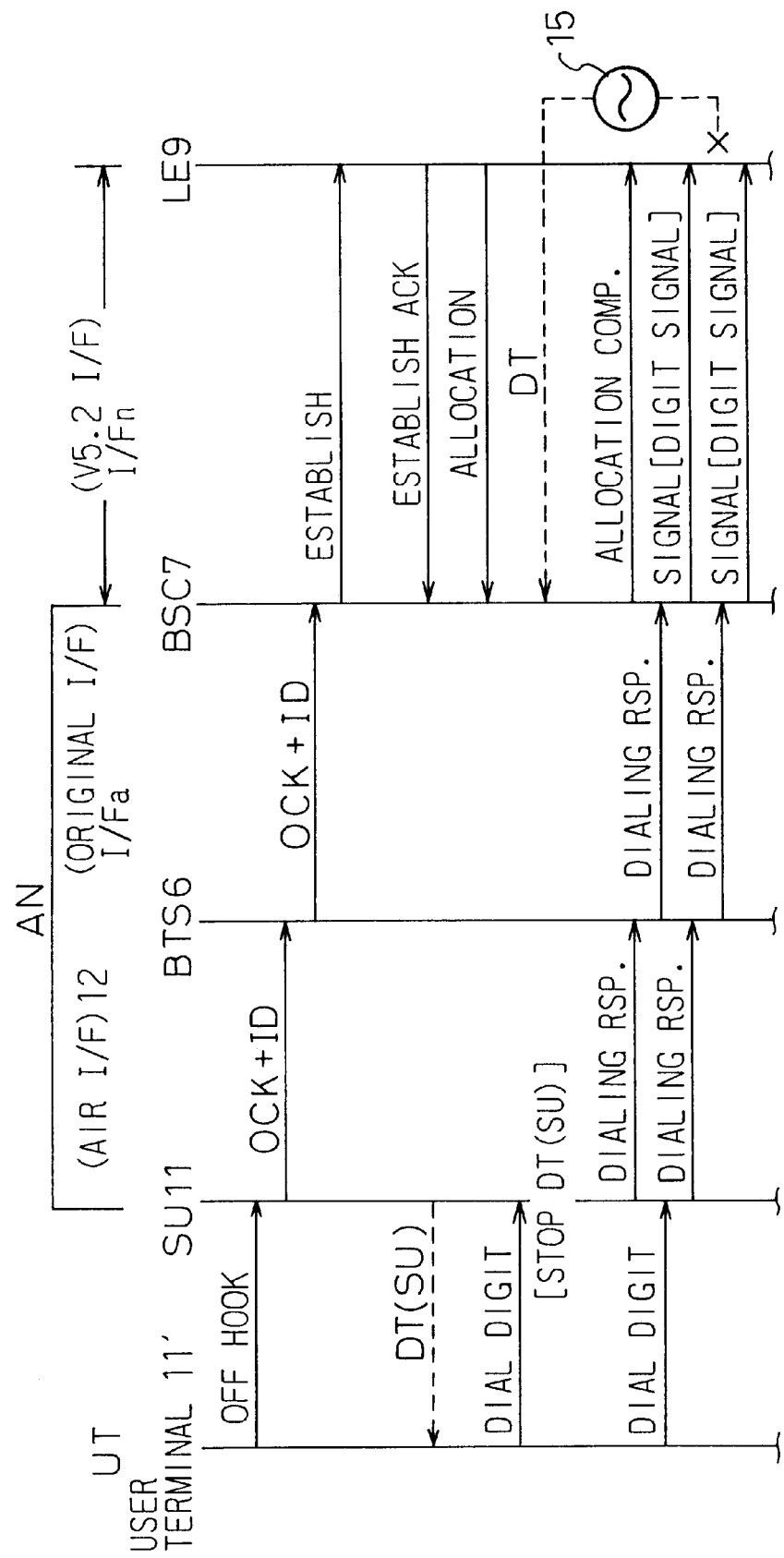
FIG. 10 is a sequence diagram showing a call origination mode based on a first embodiment.

FIG. 10 is a sequence diagram showing a call origination mode based on the first embodiment. The method of viewing the present figure is exactly the same as the case of FIGS. 5, 6, 7, 8, and 9.

This first embodiment can deal with the problems (1) to (4) mentioned before and is realized by the dial tone (DT)

reception guarantee means 20 in the subscriber unit (SU) 11 shown in FIG. 1. As a concrete example, it is realized by the dial tone (DT) generating unit 21 and the dial tone (DT) send/stop control unit 22 both in the means 20 shown in FIG. 1.

The point of the call origination mode in this first embodiment resides in the solution of the problem represented in FIGS. 7, 8, and 9, that is, to avoid a situation where after the user terminal (UT) 11' is activated, i.e., off hook, a busy tone (BT) is returned without the user hearing the dial tone (DT) and even dialing cannot be carried out.

For this reason, in the first embodiment, as represented in FIG. 10, when the user terminal (UT) 11' activated, i.e., off hook, the subscriber unit (SU) 11 returns the dial tone (DT) to the user by itself. Since it is a dial tone (DT) transmitted from the subscriber unit (SU), it is indicated as the dial tone "DT (SU)" in FIG. 10.

The user hearing this dial tone (DT) subsequently dials according to the operation for the usual call origination. The first dial number is sent to the subscriber unit (SU) 11 as a dial digit.

The subscriber unit (SU) 11 receiving this first dial digit stops the sending of the dial tone (DT) mentioned before. In FIG. 10, this is indicated as "stop DT (SU)". Note that, the sequences by the interfaces Air I/F, I/Fa, and I/Fn in FIG. 10 are the same as the above sequences (for example FIG. 6).
0051

The sending of the dial tone "DT (SU)" mentioned above in FIG. 10 can be carried out by the dial tone (DT) generating unit 21 shown in FIG. 1.

Further, the stopping of the dial tone (DT) mentioned above in FIG. 10, that is, the "stop DT (SU)", can be carried out by the dial tone (DT) send/stop control unit 22 in FIG. 1.

In the final analysis, the first embodiment provides a wireless local loop (WLL) system comprising a user terminal (UT) 11' and an access network (AN) arranged between the user terminal (UT) 11' and a local exchange (LE) 9 in a public switched telephone network (PSTN) 1, in which the access network is constituted by a subscriber unit (SU) 11 provided with the user terminal (UT) and the access control apparatus 13 connected to the subscriber unit (SU) via a radio section 12 on one hand and connected to the local exchange (LE) 9 via an inter-network interface I/Fn on the other hand, characterized in that the user terminal (UT) 11' is provided with a dial tone (DT) reception guarantee means 20 by which the user terminal (UT) 11' is guaranteed to receive a dial tone (DT) irrespective of the conditions of the channels on the local exchange (LE) 9 side after the user terminal (UT) 11' is activated (off hook).

Further, the dial tone (DT) reception guarantee means 20 has a dial tone (DT) generating unit 21 which generates a dial tone (DT) when detecting the activation ("off hook" state) and transmits this to the user terminal (UT) 11'.

The dial tone (DT) reception guarantee means 20 further has a dial tone (DT) send/stop control unit 22 which makes the dial tone (DT) generating unit 21 send a dial tone (DT) therefrom by the detection of the activation ("off hook" state) and after the sending of this dial tone (DT) makes the dial tone (DT) generating unit 21 stop the sending of the dial tone (DT) therefrom when detecting the first dial number originated from the user terminal (UT) 11'.

Further, in this first embodiment, as described above, the following call processing method is proposed. Namely, it is the call processing method in a wireless local loop (WLL) system where, when the user terminal (UT) 11' is activated, i.e., off hook, the dial tone (DT) is output from the subscriber unit 11 and supplied to the user terminal (UT) 11'.

Furthermore, after the output of the dial tone (DT), when the first dial number is originated from the user terminal (UT) 11', the output of the dial tone (DT) is stopped.

According to the above first embodiment, the generation of the dial tone and the send/stop control of the dial tone are near-end processings performed close to the user terminal (UT), therefore there is an advantage that the control is simplified. Here, "near-end processing" means processing which is not a "far-end processing", as shown in FIG. 9, where the dial tone (DT) is transferred from a far position like the local exchange (LE) 9 —>> inter-network interface I/Fn —>> access network (AN).

Accordingly, when viewing this as the overall wireless local loop (WLL) system, there is the advantage that the load for the call processing is reduced by the amount of the near-end processing.

Figure 11:
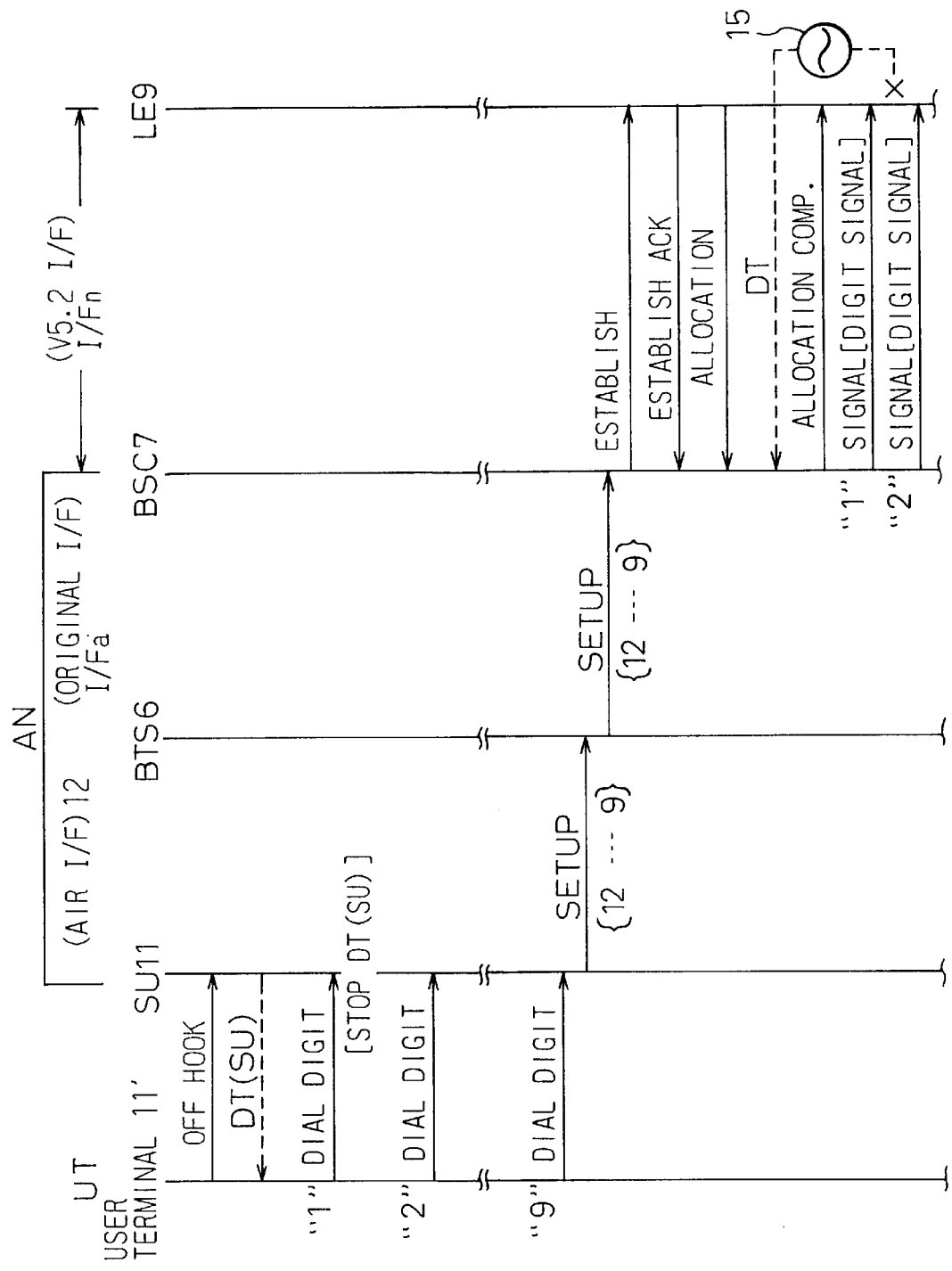
FIG. 11 is a sequence diagram showing a call origination mode based on a second embodiment.

FIG. 11 is a sequence diagram showing a call origination mode based on the second embodiment. The method of viewing of the present figure is exactly the same as the case of FIG. 10.

This second embodiment uses the first embodiment as a base. Matters mentioned concerning the first embodiment also all apply to this second embodiment.

The point of difference of the second embodiment and the first embodiment, that is, the point of the call origination mode in the second embodiment, resides in the fact that the dial information is originated from the user terminal (UT) 11' as a package. This package origination is carried out by the dial information originating unit 23 of FIG. 1 as a concrete example.

Referring to FIG. 11, the user terminal (UT) 11' receives the dial tone (DT) (SU) after being activated, i.e., off hook, and sequentially transmits the dial number in the form of dial digits. As an example, when assuming that the dial digits "12 . . . 9" are dialed, the number is supplied to the subscriber unit (SU) 11 as represented as "1", "2", . . . "9" on the left end of FIG. 11.

When viewing the conventional case here, the dial digits "12 . . . 9" are originated one by one from the subscriber unit (SU) 11 to the local exchange (LE) 9 in the order of generation like "1"→"2"→ . . . →"9" as understood from for example FIG. 6.

Compared with this conventional method, in the second embodiment, a dial number train such as "1"→"2"→ . . . →"9" is once stored in the subscriber unit (SU) 11. The dial number train is originated to for example the base station controller (BSC) 7 as a package. This operation is carried out by transmitting each "SETUP" message at the interface Air I/F and interface I/Fa in FIG. 11. According to the above example, the dial number train (12 . . . 9) is placed on this message as a package.

In the final analysis, in this second embodiment, the subscriber unit 11 has a dial information originating unit 23 for storing the dial number train, which had been sequentially originated subsequent to the first dial digit in the first embodiment, and originating the dial number train as a package to the local exchange (LE) 9 side.

Further, as already mentioned in this second embodiment, the following call processing method is proposed. Namely, there is a step of once storing the first dial digit and the dial digits sequentially originated subsequent to this in the subscriber unit 11 and a step of originating the related dial number train to the local exchange (LE) 9 side together with the message (SETUP) indicating that a stored dial number train is being originated as a package.

According to the above second embodiment, there is the advantage that the control traffic in the access network (AN) can be reduced.

Along with this, there is also the advantage that the time during which the access control apparatus 13 in the access network (AN), particularly, the base station controller (BSC) 7 is occupied, is shortened, and thus quick call processing can be carried out.

Figure 12:
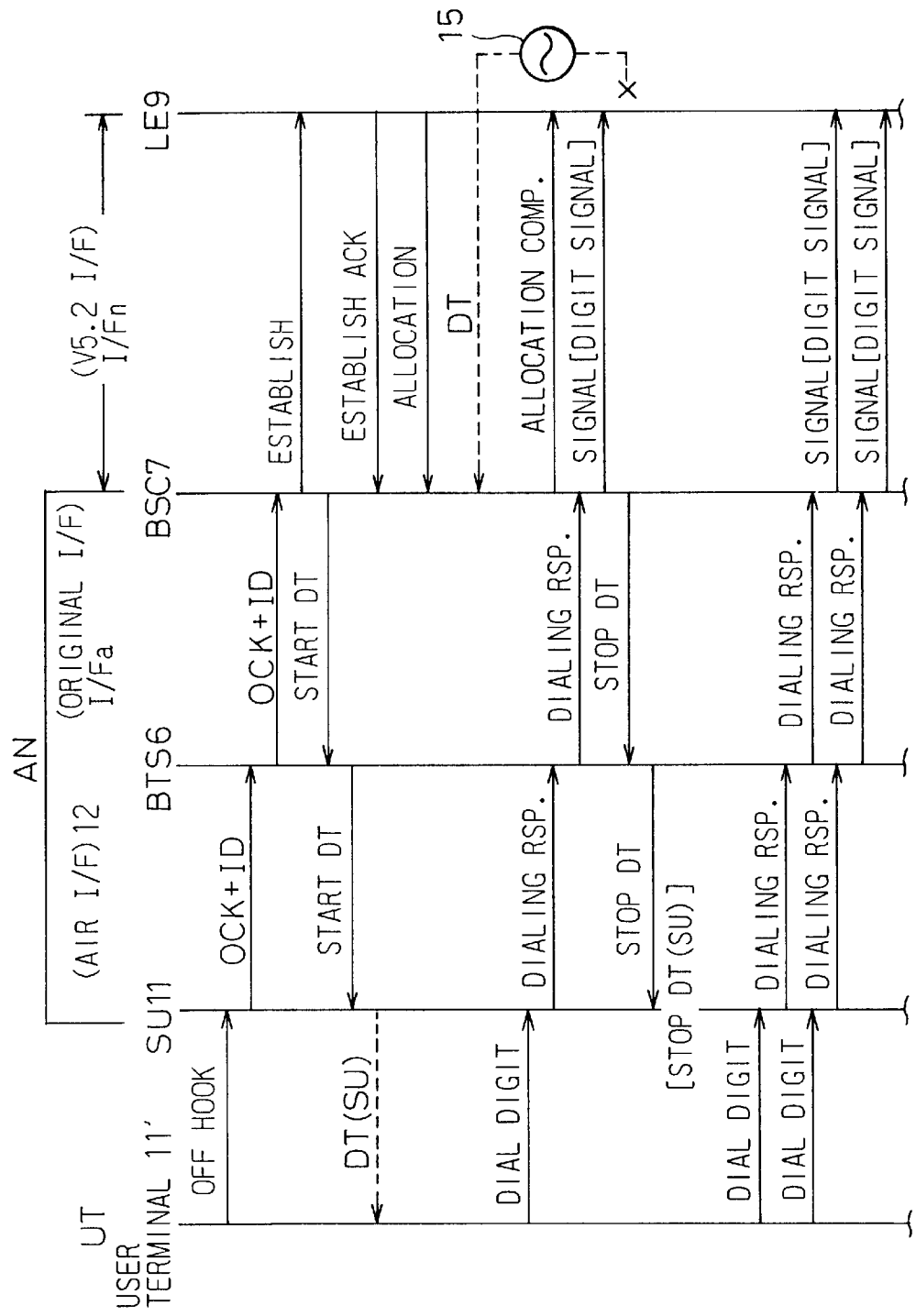
FIG. 12 is a sequence diagram showing a call origination mode based on a third embodiment.

FIG. 12 is a sequence diagram showing a call origination mode based on the third embodiment. The method of viewing the present figure is exactly the same as the case of FIG. 11 and FIG. 10 etc. mentioned before.

This third embodiment corresponds to the above first embodiment and can cope with the problems (1) to (4). The unit mainly related to this third embodiment is the dial tone (DT) send/stop control unit 22' in the access control apparatus (AC) 13 shown in FIG. 1. Reference numeral 22' is used to show that, when a similar dial tone (DT) send/stop control unit 22 is provided in the subscriber unit (SU) 11 of FIG. 1 (first embodiment), this dial tone (DT) send/stop control unit 22' (third embodiment) is not necessary. Either one of them may exist.

The point of the call origination mode in this third embodiment resides in that, as described above, the command for sending the dial tone (DT) and the command for stopping this are transmitted not from the subscriber unit (SU) 11, but from the access control apparatus (AC) 13, for example, the base station controller (BSC) 7, to the subscriber unit (SU) 11. Referring to FIG. 12, the command "START DT" and "STOP DT" from the base station controller (BSC) 7 correspond to the above send command and stop command, respectively.

Namely, in FIG. 12, by the activation, i.e., off hook, of the user terminal (UT) 11', the command "OCK +ID" is transferred from the subscriber unit (SU) 11 to the base station controller (BSC) 7. The base station controller (BSC) 7 receiving this issues a "START DT" command and returns this to the subscriber unit (SU) 11. By this, the dial tone (DT) generating unit 21 in the subscriber unit (SU) 11 is started, and the user can hear the dial tone "DT (SU)".

The user hearing the dial tone (DT) subsequently originates the dial number train (dial digits). Therefore, when the base station controller (BSC) 7 receives the first dial digit thereof as the message "Dialing Rsp.", the command "STOP DT" is immediately sent from the base station controller (BSC) 7 to the dial tone (DT) generating unit 21 in the subscriber unit (SU) 11, and the dial tone to the user is stopped.

As mentioned above, the commands "START DT" and "STOP DT" can be issued by the dial tone (DT) send/stop control unit 22' shown in FIG. 1.

In the final analysis, this third embodiment provides a dial tone (DT) send/stop control unit 22' which transmits a command for sending a dial tone (DT) to a dial tone (DT) generating unit 21 provided in a subscriber unit (SU) 11 for sending a dial tone (DT) to a user terminal (UT) 11' when receiving a signal indicating the "off hook" state from the user terminal (UT) 11' and, at the same time, transmits a command for stopping the sending of that dial tone (DT) when detecting the first dial digit originated from the user terminal (UT) 11'.

Further, according to this third embodiment, as described above, the following call processing method is proposed. Namely, the dial tone (DT) is sent by a command sent from the access control apparatus 13 when detecting the activation, i.e., off hook, from the user terminal (UT) 11'. The dial tone (DT) being sent is stopped by a stop command issued from the access control apparatus 13 when detecting the first dial digit from the user terminal (UT) 11'.

According to the above third embodiment, there is the advantage that sources for issuing a command such as a call origination order to the local exchange (LE) 9 and commands to the subscriber unit (SU) 11 can be all concentrated into one unit, i.e., the access control apparatus (AC) 13, especially the base station controller (BSC) 7, thus a system configuration which can be easily understood by a system designer or person performing maintenance can be exhibited.

Figure 13:
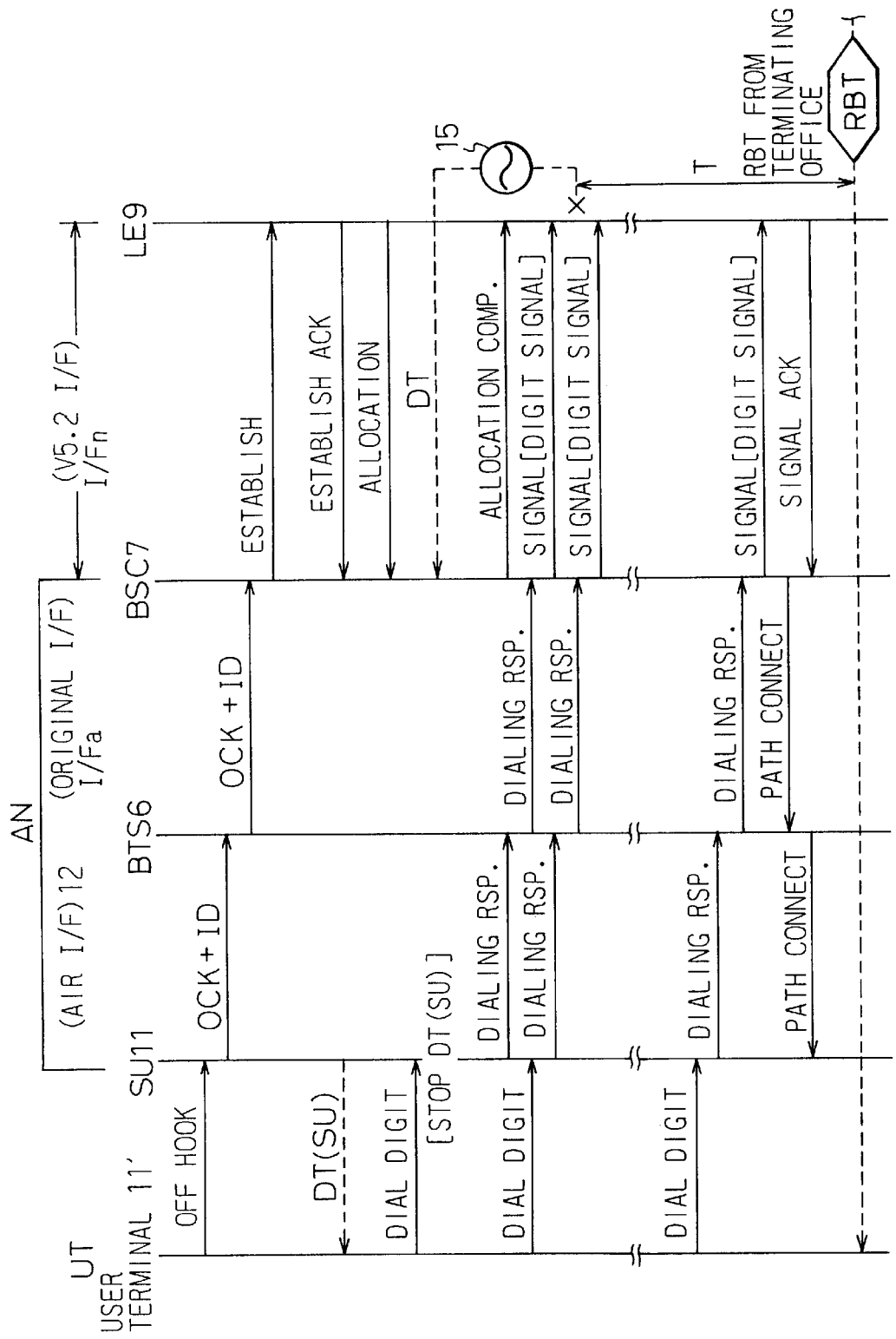
FIG. 13 is a sequence diagram showing a call origination mode based on a fourth embodiment.

FIG. 13 is a sequence diagram showing a call origination mode based on the fourth embodiment. The method of viewing the present figure is the same as the case of the figures mentioned above.

This fourth embodiment relates to the path connections in each embodiment. Note that, in the above figures, respective routes of the path connections are shown in FIGS. 5, 6, and 9. As mentioned before, this path connection is for forming a voice channel, but not only voice information, but also a dial tone (DT) and ringback tone (RBT) first arrive at the ears of the user by the formation of this path connection.

Referring to FIG. 6 as a representative example, in general, when allocation of a time slot (TS) is carried out according to the assignment sequence by a V5.2 interface, the process immediately enters into the sequence for forming the path connection ("path connect" in the present figure), and if it is OK, the dial tone (DT) is subsequently sent from the tone trunk 15 in the local exchange (LE) 9 and reaches the user terminal (UT) 11'.

The present invention, however, as shown in FIG. 10 etc., is characterized in that the subscriber unit (SU) 11 generates the dial tone by itself and sends the same as the dial tone "DT (SU)" to the user terminal (UT) 11'.

If the sequence shown in FIG. 6 is adopted as it is, from the user's viewpoint, after hearing the dial tone (DT) from the subscriber unit (SU) 11 and dialing, the user then hears another dial tone (DT) from the local exchange (LE)— which gives a uncomfortable feeling.

So as to eliminate this uncomfortable feeling, in the fourth embodiment, the end of the transmission of the dial tone from the local exchange (LE) 9 is awaited by the usual procedure and the path connection is formed after this. That is, in FIG. 13, the first dial digit is originated from the user terminal (UT) 11' and this is transferred to the local exchange (LE) 9 as the signal message (SIGNAL_ (digit signal) to stop the dial tone (DT), and thereafter the path connection is formed.

Even after the time when the dial tone (DT) is stopped, the path connection must be formed before the ringback tone (RBT) or general announcement with respect to the related originating call is returned from the opposing exchange, i.e., terminating office. That is, in FIG. 13, it is necessary to form the path connection during the term represented by "T" on the right end thereof.

In the example of the present figure, the formation of the path connection is carried out in the term T immediately after the signal message (SIGNAL) (digit signal) corresponding to the last dial digit originated from the user is transmitted by the base station controller (BSC) 7. This timing is the most preferred.

If the path connection were formed at the start of the above period T, there would be a possibility that a useless sound information would be heard by the user through the voice channel resulting from the related path connection for a long time up to the reception of the ringback tone (RBT).

On the other hand, when the path connection were formed at the end of the above period T and if the above general announcement is sent, there would be an apprehension that the beginning part would be missing. This general announcement is a notification message, for example, "this telephone is not available at present". There would be an apprehension that the first part thereof would not be transferred to the user.

Accordingly, in consideration of the above situations, desirably the path connection is formed immediately after the last signal message (SIGNAL) is transmitted to the local exchange (LE) 9. Note that, in this case, in the period after the dial tone (DT) is disconnected to when the path connection is formed, absolutely no sound is given to the user.

The formation of the path connection, mentioned above in FIG. 1, can be carried out by the path connection forming unit 31 in the access control apparatus (AC) 13.

In conclusion, this fourth embodiment is characterized by the provision of a path connection forming unit 31 for forming a path connection to the user terminal (UT) 11' in the period from when the first dial digit among a series of dial digits originated after the activation, i.e., off hook, of the user terminal (UT) 11' is received and the dial tone (DT) from the local exchange 9 stops to when the last dial digit is received and the ringback tone (RBT) is returned from the local exchange (LE) 9.

Further preferably, the path connection forming unit 31 forms the path connection to the user terminal (UT) 11' immediately after sending the signal message (SIGNAL) to the local exchange (LE) 9 in response to the last dial digit.

Further, according to the fourth embodiment, as described above, the following call processing method is proposed. Namely, the path connection to the subscriber unit 11 is formed during a term from when the first dial digit is originated from the user terminal (UT) 11' and the dial tone from the local exchange 9 stops by this to immediately after the origination of the last dial digit from the user terminal (UT) 11'.

According to the above fourth embodiment, during the standby state for call connection from the user terminal (UT) to the opposing user terminal (UT), the original dial tone (DT) can be prevented from being heard from the local exchange (LE) without missing the beginning of the general announcement—which sometimes occurs after the dialing.

Figure 14:
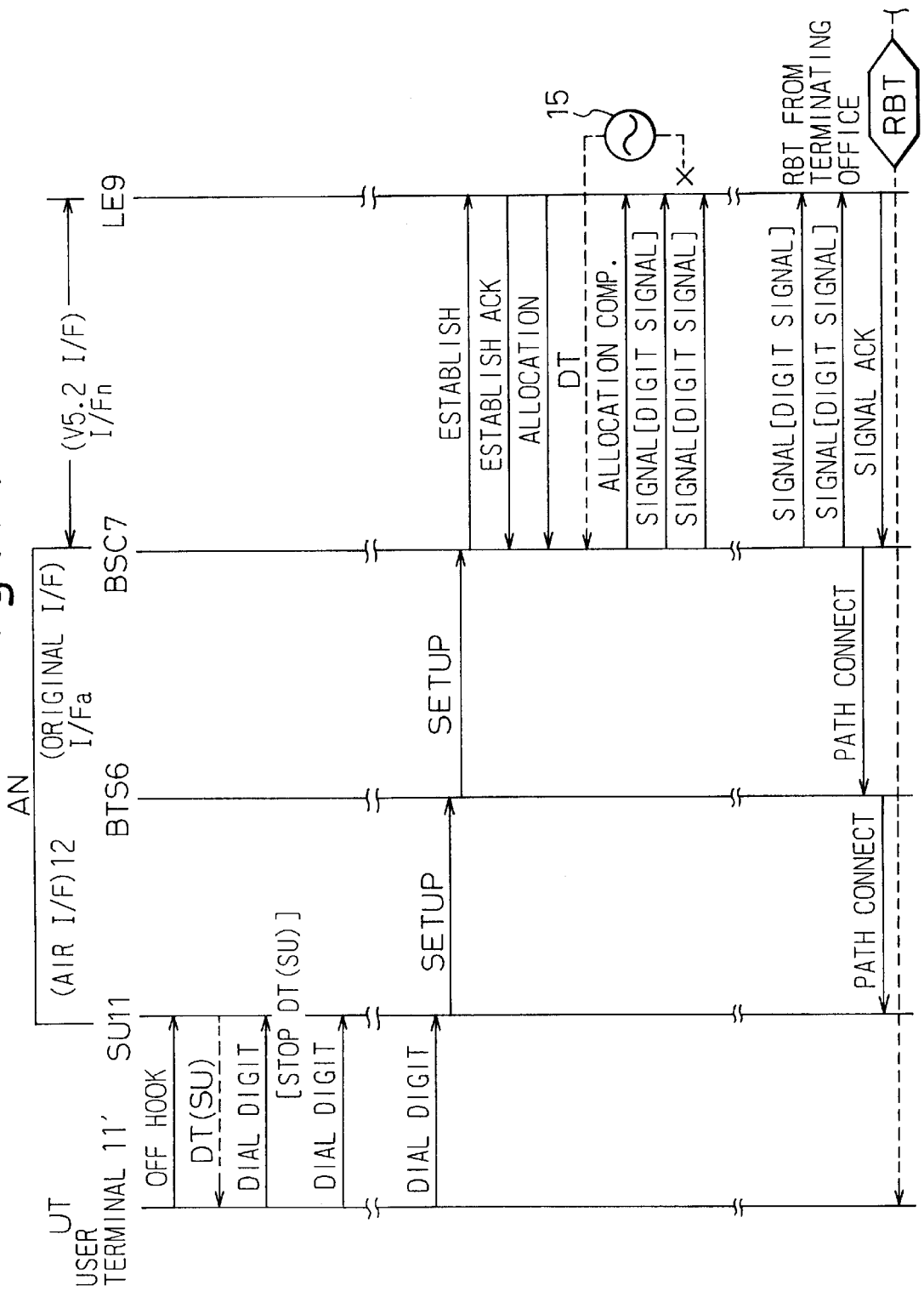
FIG. 14 is a sequence diagram showing a call origination mode combining the second embodiment and the fourth embodiment.

FIG. 14 is a sequence diagram showing a call origination mode combining the second embodiment and the fourth embodiment. The call origination mode of this FIG. 14 is a mode in which the originating operation as a package in the second embodiment is introduced in the fourth embodiment.

Namely, in the sequence of FIG. 14, the "SETUP" message of FIG. 11 is replaced by "dialing Rsp." for every dial digit of FIG. 13.

Accordingly, this means that the call origination mode of FIG. 14 has both of the advantage of the second embodiment and the advantage of the fourth embodiment.

Figure 15:
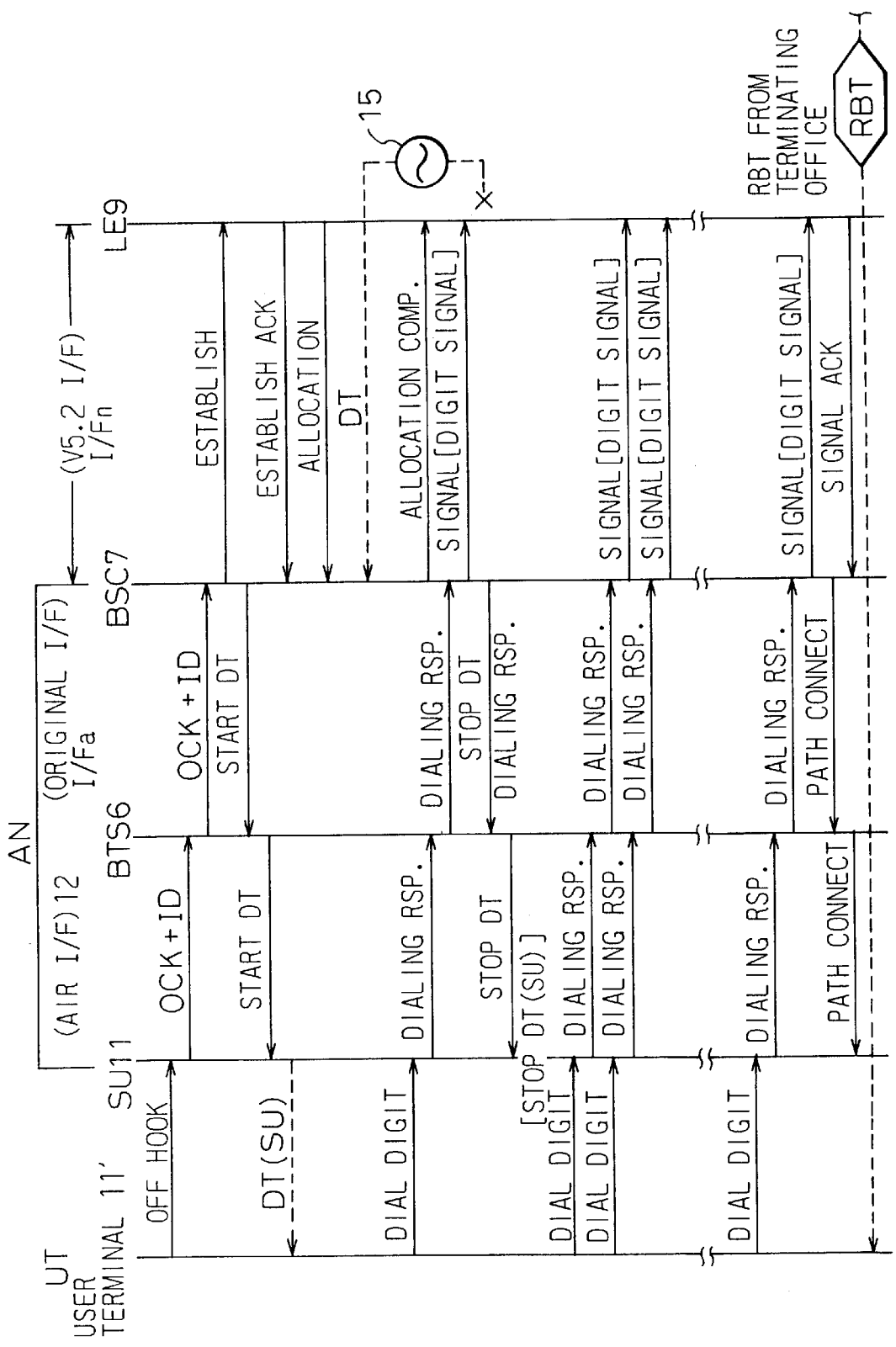
FIG. 15 is a sequence diagram showing a call origination mode combining the third embodiment and the fourth embodiment.

FIG. 15 is a sequence diagram showing a call origination mode combining the third embodiment and the fourth embodiment. The call origination mode of FIG. 15 is a mode in which the dial tone (DT) send/stop operation by the base station controller (BSC) 7 in the third embodiment is introduced to the fourth embodiment.

Accordingly, in the sequence of FIG. 15, the "START DT" command and "STOP DT" command from the base station controller (BSC) 7 shown in FIG. 12 are replaced by a dial tone "DT (SU)" step and [STOP DT (SU)] step from subscriber unit (SU) 11 shown in FIG. 13.

Accordingly, this means that the call origination mode of FIG. 15 has both of the advantage of the third embodiment and the advantage of the fourth embodiment.

Figure 16:
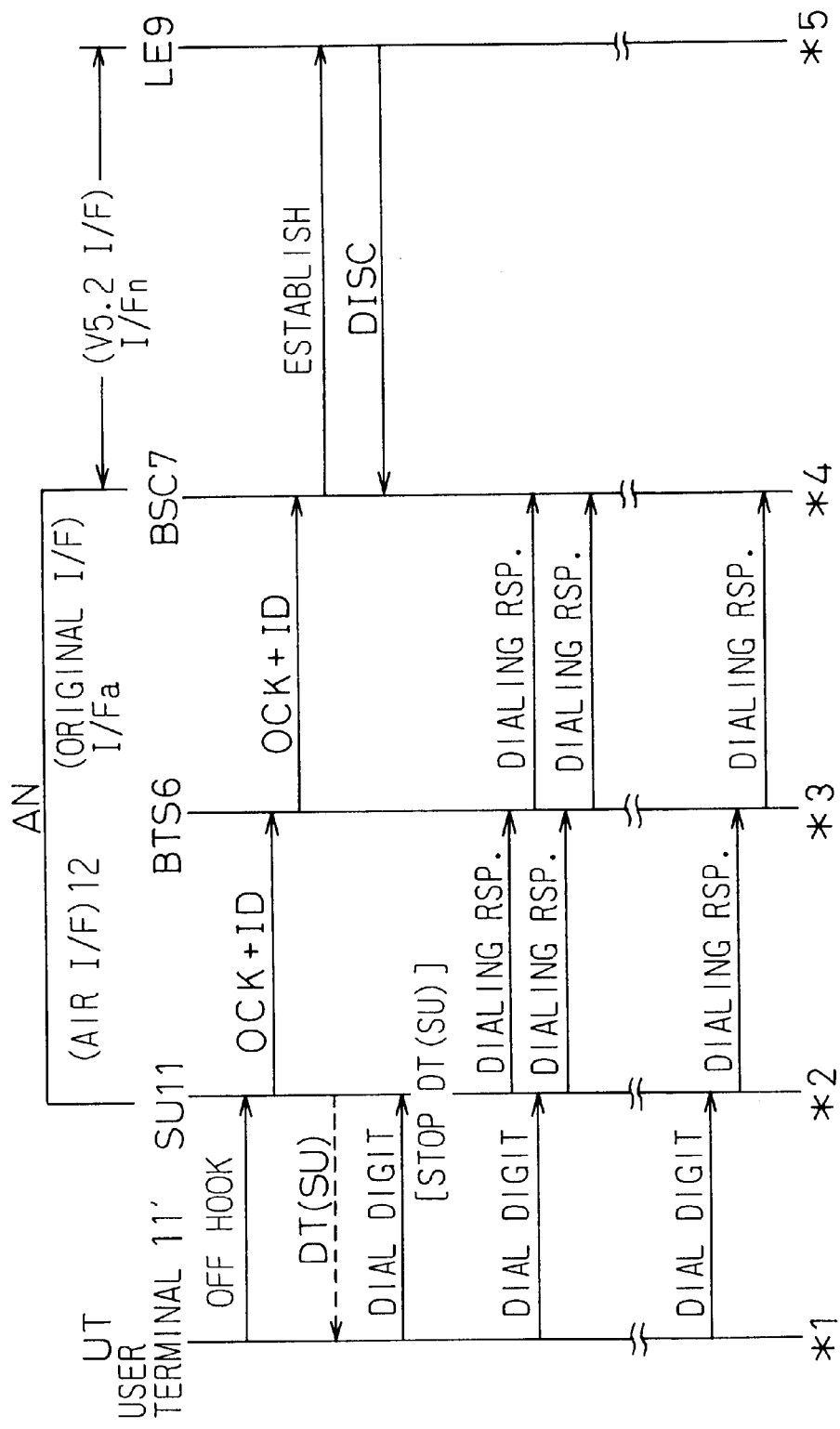
FIG. 16 is a first part of a sequence diagram showing a call origination mode based on a fifth embodiment.
Figure 17:
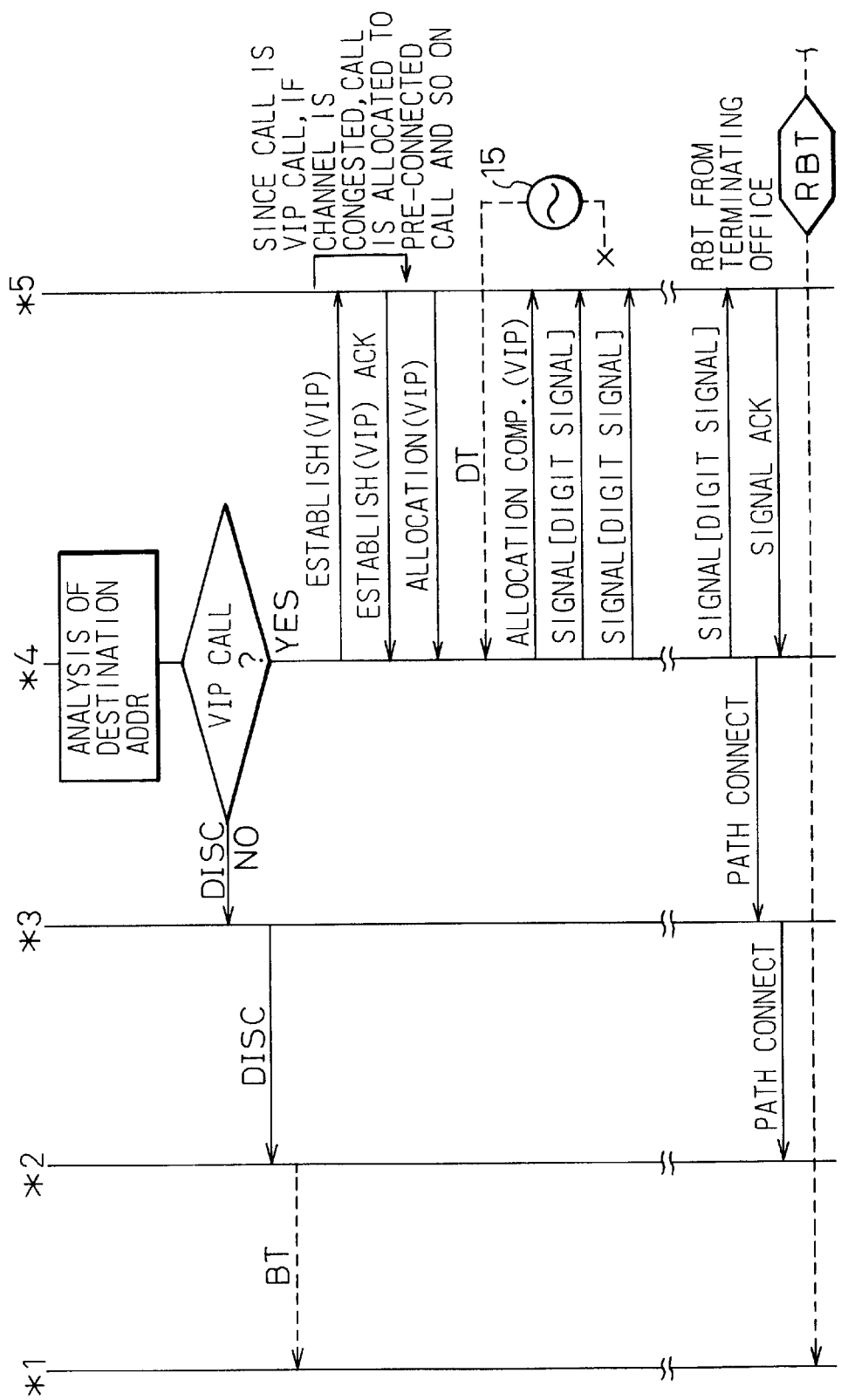
FIG. 17 is a second part of a sequence diagram showing a call origination mode based on the fifth embodiment.

FIG. 16 and FIG. 17 are first and second parts of a sequence diagram showing a call origination mode based on the fifth embodiment.

This fifth embodiment can handle the "very important phone" (VIP) calls mentioned in the above problems (1) to (4). The point of the call origination mode in this fifth embodiment resides in the relief of a "very important phone" (VIP) call from the rejection of origination of the "very important phone" (VIP) call shown in FIG. 8 and FIG. 9. For this purpose, the access control apparatus (AC) 13 transmitted the command (ESTABLISH) for requesting connection to the local exchange (LE) 9, but when the disconnection message (DISC) was returned, analyzes the related call destination address (destination ADDR) and if the related call is a "very important phone" (VIP) call, sends a command (ESTABLISH) for requesting connection indicating that the call is a "very important phone" (VIP) call to the local exchange (LE) 9 again. The local exchange (LE) 9 receiving this allots the pre-connected channel (CH) to the related "very important phone" (VIP) call.

This will be explained by referring to FIGS. 16 and 17. The fifth embodiment shown in these figures uses the first embodiment shown in FIG. 10 as a basis. Accordingly, the sequence shown in FIG. 16 is equivalent to the sequence shown in FIG. 10. However, the disconnection message (DISC) is returned from the local exchange (LE) 9 due to channel congestion and the sequence of ALLOCATION COMP, SIGNAL [digit signal] . . . shown in the right bottom of FIG. 10 does not appear in FIG. 16.

The characteristic feature of the fifth embodiment is represented in FIG. 17. In FIG. 17, when the reception of all of the dial number train is ended, the call destination address (destination ADDR) specified by this dial number train is analyzed ("destination ADDR analysis" in the figure). By this analysis, it is known whether or not the related originating call is a "very important phone" (VIP) call.

According to whether or not the related call is a "very important phone" (VIP) call ("VIP call?" in the figure), if the related call is not a "very important phone" (VIP) call (no), the disconnection message (DISC) shown at the right top of FIG. 16 travels as it is to the subscriber unit (SU) 11 and the subscriber unit (SU) 11 sends a busy tone (BT) to the user terminal (UT) 11'.

On the other hand, when it is known that the related call is a "very important phone" (VIP) call (yes), the message for requesting connection (ESTABLISH (VIP)) is sent to the local exchange (LE) 9 again. Here, "again" is because the connection requesting message (ESTABLISH) has been already sent in response to the activation, i.e., off hook, of the user terminal (UT) 11' as shown at the top right of FIG. 16. Note that, the determination of whether or not the related call is a "very important phone" (VIP) call can be carried out because a table listing "very important phone" (VIP) calls is prepared in advance in the access control apparatus 13. When a "very important phone" (VIP) address stored in this table coincides with the received destination ADDR, the related call can be determined to be a "very important phone" (VIP) call.

The connection requesting message (ESTABLISH (VIP)) sent to the local exchange (LE) 9 again is recognized to be a "very important phone" (VIP) call in the local exchange (LE) 9, so the allocation is carried out with priority. For example, this means that a time slot (TS) using the pre-connected channel (CH) is allocated. As a result, the "ALLOCATION (VIP)" signal shown on the right side of FIG. 17 is returned to the base station controller (BSC) 7. The sequence after this is exactly the same as the sequence shown in FIG. 13 etc. until the formation of the path connection.

The processing of the "very important phone" (VIP) call mentioned above can be carried out by the "very important phone" (VIP) call processing unit 32 in the access control apparatus (AC) 13 shown in FIG. 1.

In conclusion, this fifth embodiment is characterized in the provision of a "very important phone" (VIP) call processing unit 32 provided with the facility of analyzing a dial number train originated from the user terminal (UT) 11' when a disconnection message (DISC) is returned from a local exchange (LE) 9 with respect to a connection request (ESTABLISH) sent in response to the activation ("taking off hook") of the user terminal (UT) 11', determining whether or not the related dial number train is a "very important phone" (VIP) call, and if it is a "very important phone" (VIP) call, sending a connection request (ESTABLISH (VIP)) indicating that the related dial number train is a "very important phone" (VIP) call to the local exchange (LE) 9 again, and, when it is not a "very important phone" (VIP) call, transferring the above disconnection message to the subscriber unit 11 as it is.

Further, according to the fifth embodiment, as mentioned before, the following call processing method is proposed. Namely, it is a method having a step of sending a connection request (ESTABLISH) to a local exchange (LE) 9 by the origination of a first dial digit, a step of analyzing a dial number train originated subsequent to the first dial digit when a disconnection message (DISC) is returned with respect to the connection request and determining whether this corresponds to a predetermined "very important phone" (VIP) call; and a step of sending a request for connection (ESTABLISH (VIP)) indicating that the related call is a "very important phone" (VIP) call again if it is a "very important phone" (VIP) call and transferring the disconnection message to the subscriber unit 11 as it is if it is not a "very important phone" (VIP) call.

According to the above fifth embodiment, even if a disconnection message is once returned from the local exchange (LE) 9, if the originating call is a "very important phone" (VIP) call, this can be relieved.

Figure 18:
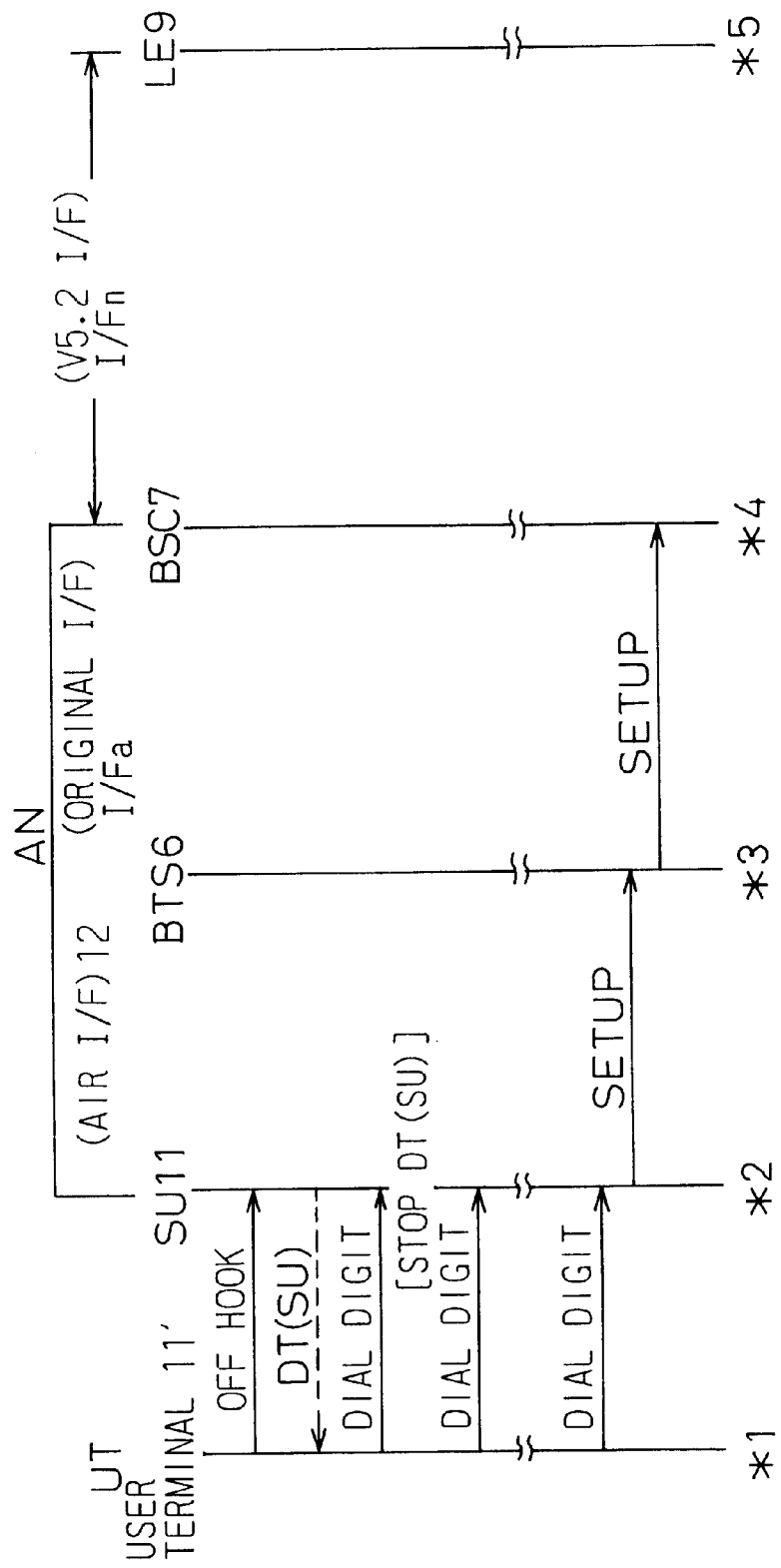
FIG. 18 is a first part of a sequence diagram showing a call origination mode based on a sixth embodiment.
Figure 19:
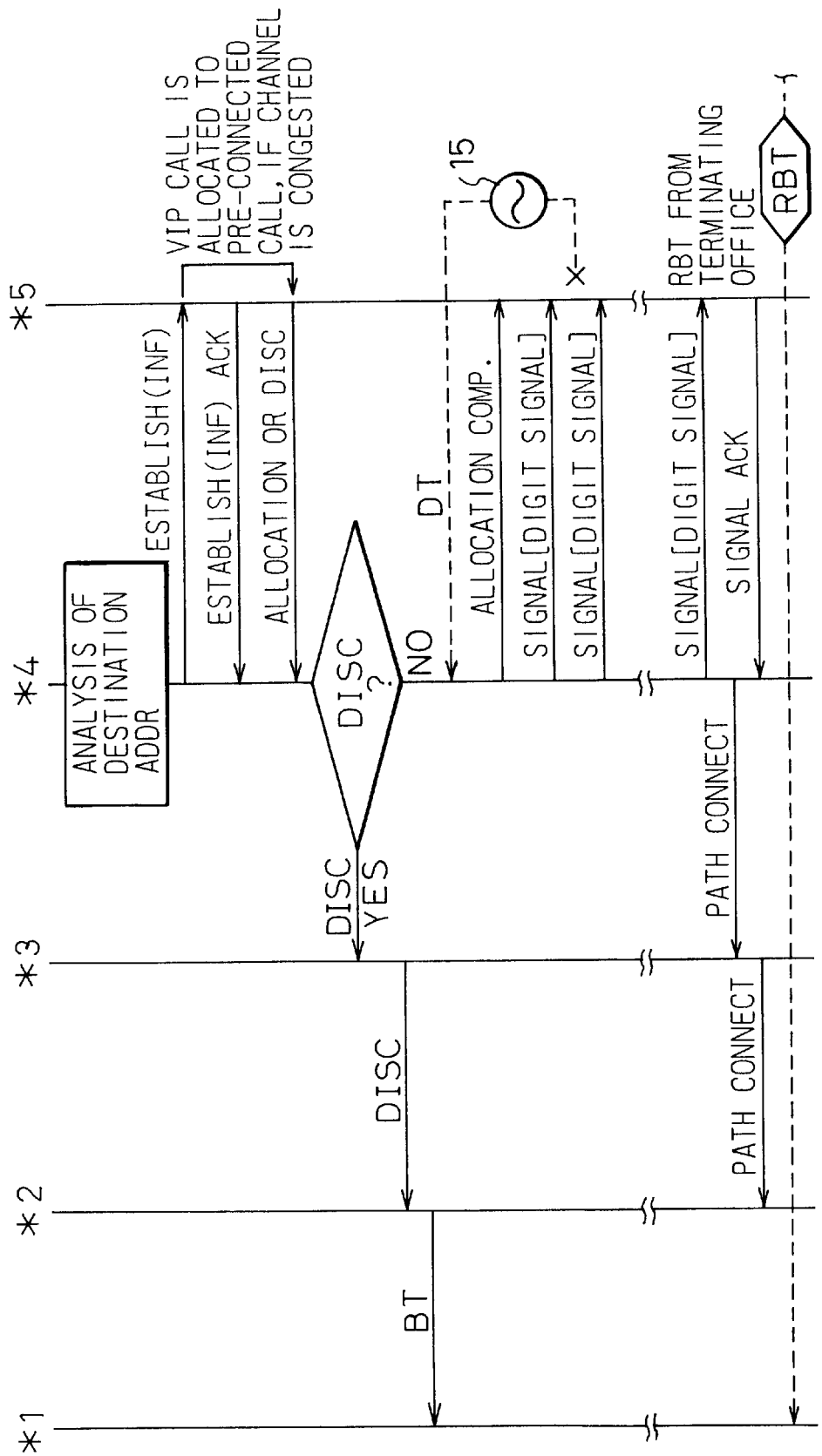
FIG. 19 is a second part of a sequence diagram showing a call origination mode based on the sixth embodiment.

FIG. 18 and FIG. 19 are first and second parts of a sequence diagram showing a call origination mode based on the sixth embodiment.

This sixth embodiment can handle the "very important phone" (VIP) calls mentioned in the problems (1) to (4) similar to the fifth embodiment. The point of the call origination mode in this sixth embodiment resides in the relief of a "very important phone" (VIP) call when the origination of the "very important phone" (VIP) call is rejected. For this purpose, the access control apparatus (AC) 13 analyzes the dial number train (destination ADDR) from the user terminal (UT) 11' and transmits the connection request (ESTABLISH) to the local exchange (LE) 9 together with the information (INF) discriminating whether the related originating call is a general call or "very important phone" (VIP) call, and if the pre-connected channel (CH) is free, the time slot (TS) is allocated, and if it is not free, transfers the disconnection message (DISC) to the subscriber unit (SU) 11.

This will be explained by referring to FIGS. 18 and 19. The sixth embodiment shown in these figures uses the second embodiment shown in FIG. 11 as a basis. Accordingly, the sequence shown in FIG. 18 is equivalent to the sequence shown in FIG. 11.

The characteristic feature of the sixth embodiment is represented in FIG. 19. In FIG. 19, a dial number train originated as a package by the "SETUP" message is received and the call destination address thereof is analyzed ("destination ADDR analysis" in the figure). By this analysis, whether the related originating call is ae general call or a "very important phone" (VIP) call is determined by using the table mentioned in the fifth embodiment.

The subsequent connection request (ESTABLISH) is a request for connection containing the discrimination information (INF) indicating whether the related originating call is a general call or a "very important phone" (VIP) call based on the above determination ("ESTABLISH (INF)" in the figure).

The local exchange (LE) 9 receiving this determination (ESTABLISH (INF)) views the discrimination information (INF) thereof. If the call is a "very important phone" (VIP) call and in addition the channels are congested, the LE 9 allocates a time slot (TS) of the pre-connected channel (CH). If a time slot (TS) cannot be allocated, it returns a disconnection message (DISC) to the base station controller (BSC) 7.

When the disconnection message (DISC) is returned, the access control apparatus (AC) 13 (BSC 7) transfers this to the subscriber unit (SU) 11 as it is. Further, the busy tone (BT) is sent to the user terminal (UT) 11'. If the disconnection message (DISC) is not returned, similar to FIG. 11, after sending the signal, a message (SIGNAL [digit signal]), the path connection is formed. In this case, the signal message is carried out by utilizing the dial number train held at the call destination address analysis ("destination ADDR analysis") mentioned before.

The processing of the "very important phone" (VIP) call mentioned above can be carried out by the "very important phone" (VIP) call processing unit 32 in the access control apparatus (AC) 13 shown in FIG. 1.

In conclusion, this sixth embodiment is characterized in the provision of a "very important phone" (VIP) call processing unit 32 provided with a facility of analyzing originated dial number train as a package subsequent to the activation, i.e., off hook, of the user terminal (UT) 11', determining whether the related dial number train is a general call or a "very important phone" (VIP) call, and transmitting the connection request (ESTABLISH (INF)) containing the discrimination information (INF) by the result of the determination to the local exchange (LE) 9.

Further, according to the sixth embodiment, as mentioned before, the following call processing method is proposed. Namely, it is a method having a step of receiving and analyzing the first dial digit and the dial number train sequentially originated subsequent to this and performing the decision of whether the related originating call is a general call or a "very important phone" (VIP) call and a step of sending a connection request (ESTABLISH (INF)) accompanied by the information indicating the result of the decision to the local exchange (LE) 9.

According to the above sixth embodiment, a "very important phone" (VIP) call at the time of channel congestion can be relieved faster than the case of the fifth embodiment.

Figure 20:
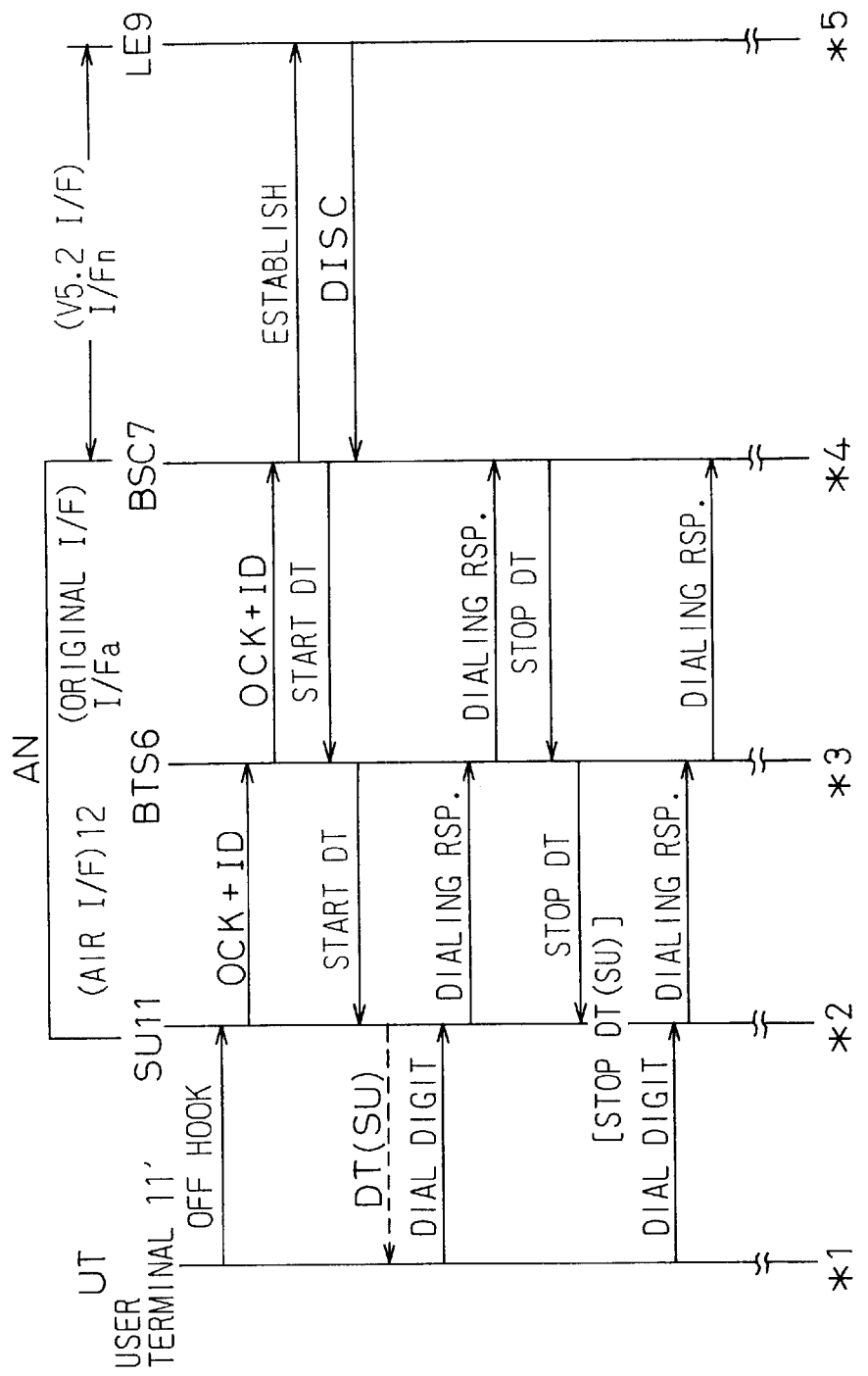
FIG. 20 is a first part of a sequence diagram showing a call origination mode combining the third embodiment and the fifth embodiment.
Figure 21:
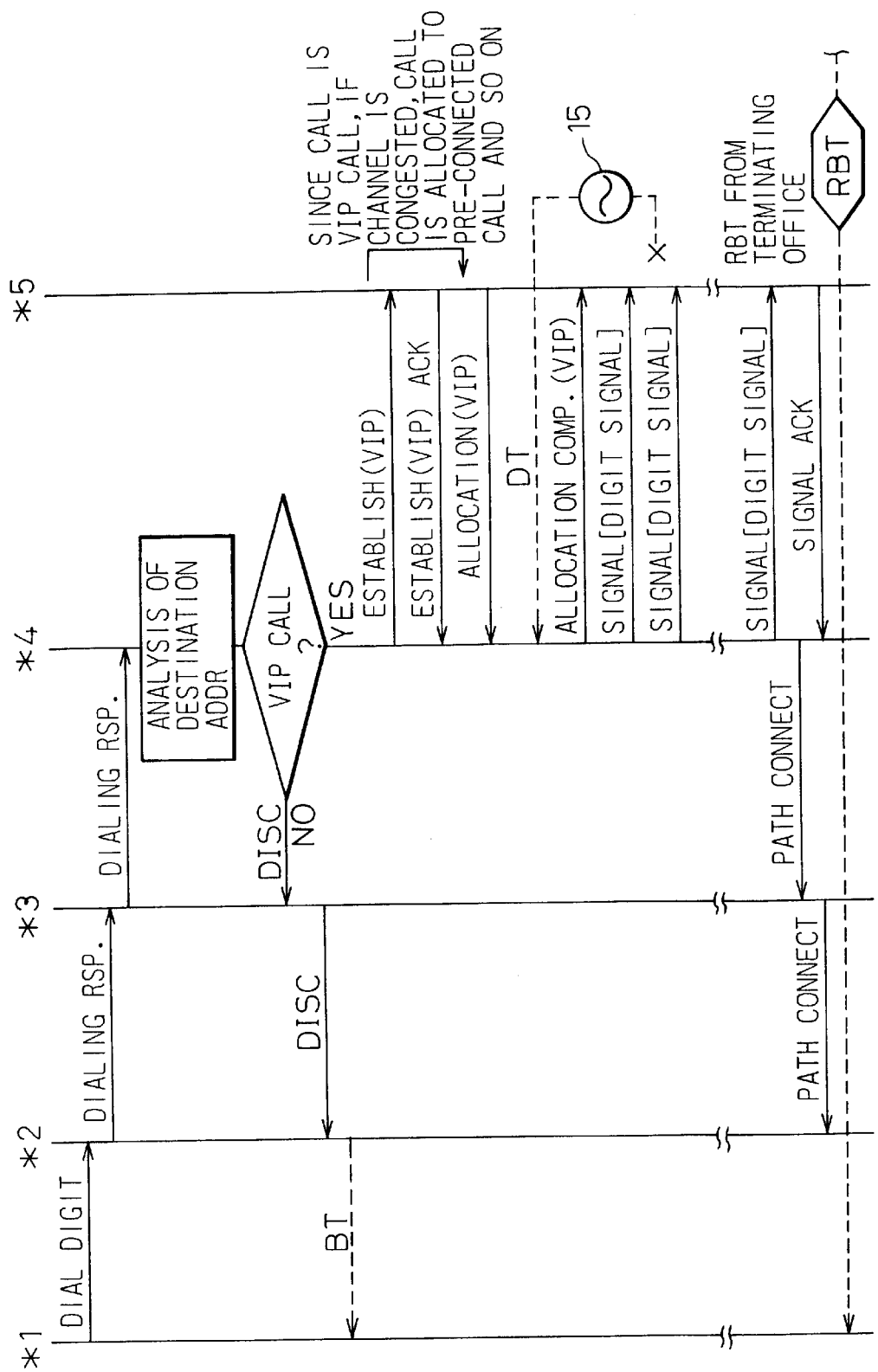
FIG. 21 is a second part of a sequence diagram showing a call origination mode combining the third embodiment and the fifth embodiment.

FIG. 20 and FIG. 21 are first and second views of a sequence diagram showing a call origination mode combining the third embodiment and the fifth embodiment.

Namely, the sequence of FIG. 20 corresponds to the first half of FIG. 12. However, the sequence of FIG. 20 represents a case where the request for connection (ESTABLISH) is rejected by the local exchange (LE) 9 and the disconnection message (DISC) is returned in the first half of the sequence of FIG. 12. The sequence of FIG. 21 is almost the same as the sequence of FIG. 17.

Accordingly, this means that the call origination modes of FIGS. 20 and 21 have both of the advantage of the third embodiment and the advantage of the fifth embodiment.

Concerning the already mentioned problems (1) to (4), mention was made of the fact that handling of overflow calls generated among general calls was also important along with handling the "very important phone" (VIP) calls. In the following embodiment, a description will be made of the handling of such overflow calls.

Figure 22:
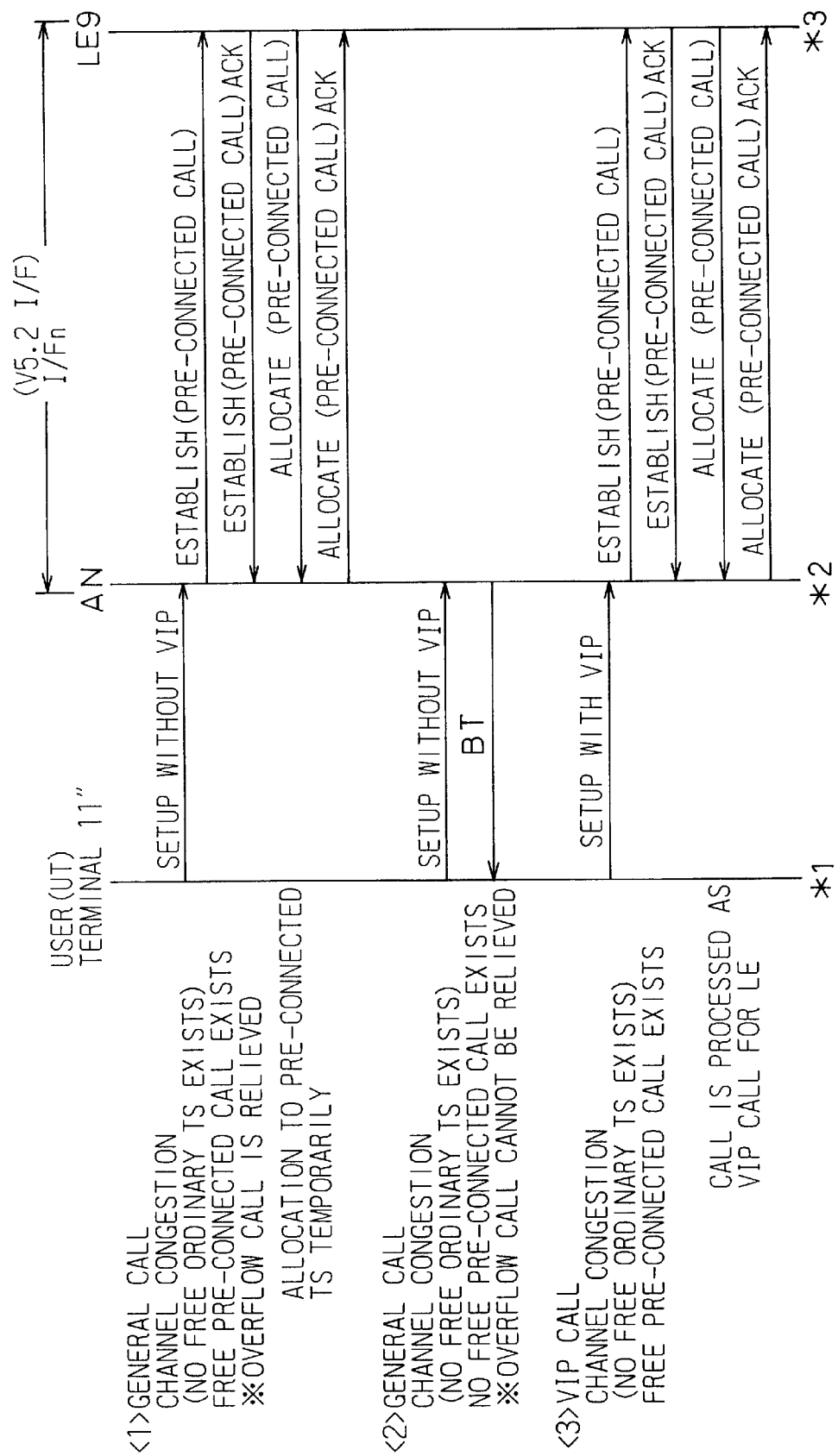
FIG. 22 is a first part of a sequence diagram showing a call origination mode based on a seventh embodiment.
Figure 23:
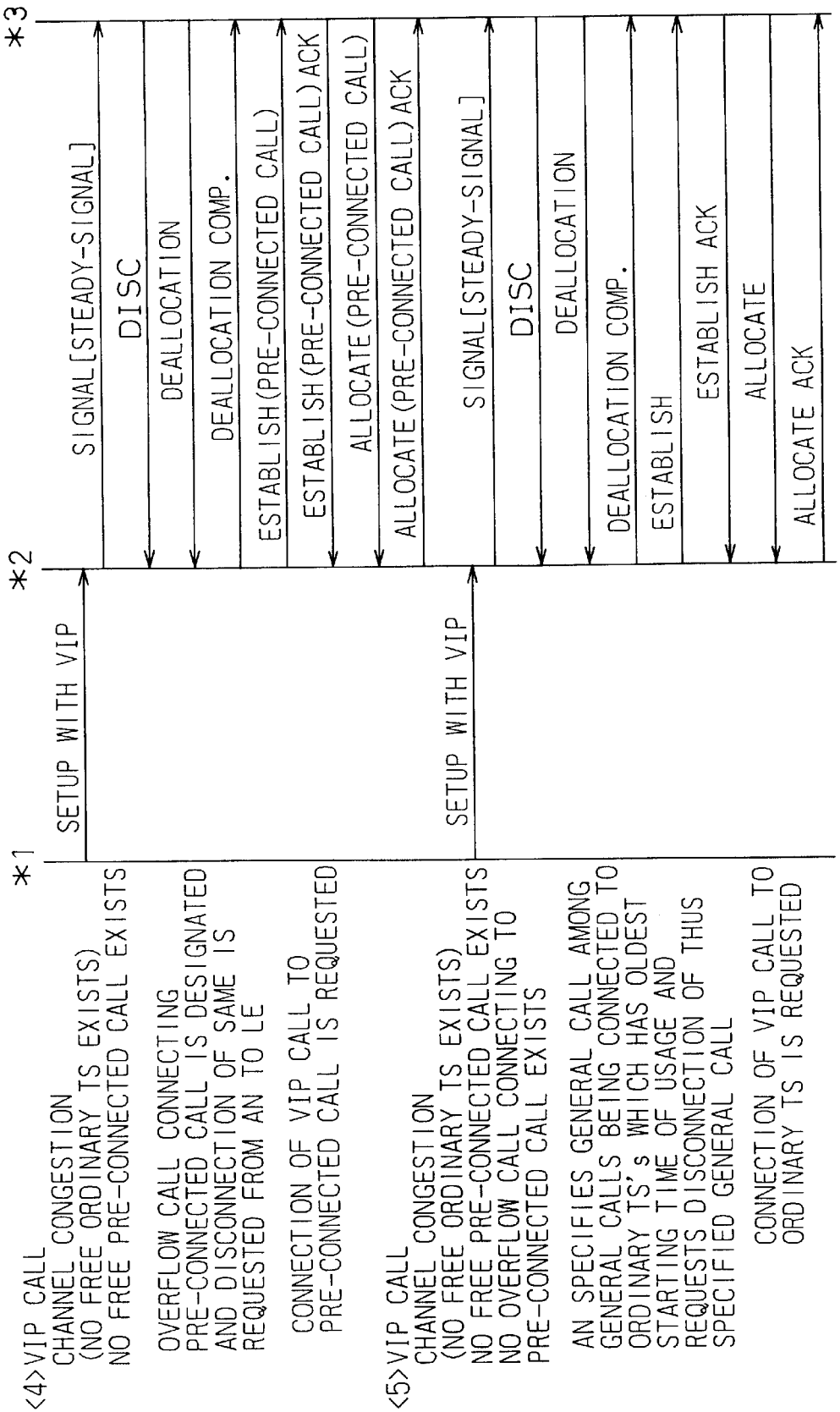
FIG. 23 is a second part of a sequence diagram showing a call origination mode based on the seventh embodiment.

FIG. 22 and FIG. 23 are first and second parts of a sequence diagram showing a call origination mode based on the seventh embodiment.

At the time of channel congestion, there are calls for which origination is rejected among the general calls. These are called "overflow calls". If a time slot (TS) for the pre-connected channel (CH) can be allocated to such an overflow call in the same way as a "very important phone" (VIP) call, it can be relieved in the form of a pre-connected call.

Concretely, when a congestion of calls occurs in the network use interface I/Fn, for example V5.2 interface, the pre-connected call may be diverted for use for an overflow call.

The allocation of a pre-connected call to an overflow call is concretely performed in the access network (AN) by the access control apparatus (AC) 13 of FIG. 1 comprising for example the base transceiver station (BTS) 6 and the base station controller (BSC) 7.

This access control apparatus (AC) 13 transmits the request for connection (ESTABLISH) of the overflow call to the local exchange (LE) 9 as a call equivalent to a "very important phone" (VIP) call. In this case, it is acceptable even if the local exchange (LE) 9 is not concerned about the mode of use of the pre-connected channel (CH), for example, whether the pre-connected call is used for an overflow call or a "very important phone" (VIP) call.

Namely, the access control apparatus (AC) 13 autonomously diverts use of a pre-connected call for an overflow call or compulsorily disconnects a general call among a plurality of general calls selected with a predetermined criteria for this purpose. That is, the access control apparatus (AC) 13 requests a disconnection message (DISC) to the local exchange (LE) 9 by its own determination.

First, FIG. 22 will be referred to.

<1> Ordinary Call

In the mode of <1> ordinary call represented on the left end of the figure, an indication that the related call is not a "very important phone" (VIP) call is attached to the "SETUP" message of FIG. 11 (second embodiment) and transferred from the user terminal (UT) 11' side to the access network (AN) side, while a request for connection ("ESTABLISH (pre-connected call)") for the pre-connected call is sent to the local exchange (LE) 9.

In response to this, when the allocation of a time slot (TS) to a pre-connected call is acknowledged, the relief of a general call which originally would have become an overflow call in a situation where no time slots (TS) are free can be attempted.

<2> Ordinary Call

In this mode, the busy tone (BT) is returned from the access network (AN) side and the process is ended.

<3> "Very important phone" (VIP) Call

In this mode, the "SETUP" message carrying the "very important phone" (VIP) is sent from the user terminal (UT) 11' side to the access network (AN) side as an order.

The sequence after this is similar to the sequence of <1> ordinary call mentioned above, and the local exchange (LE) 9 processes the related call as a "very important phone" (VIP) call.

<4> "Very important phone" (VIP) Call (FIG. 23)

In this mode, a command (SIGNAL [standby-signal]) is sent from the access network (AN) side to the local exchange (LE) 9 side. This SIGNAL [standby-signal] would have originally been an overflow call, command requests a disconnection (DISC) of a call to the local exchange (LE) 9 if there is a call which would have originally been an overflow cell but is in use by diverting use of a pre-connected call. Further, along with this, the local exchange (LE) 9 returns a command (DEALLOCATION) for releasing the time slot (TS) allocated to the changed call to the access network (AN) side. The sequence after returning the notification of completion (DEALLOCATION COMP) of this command to the local exchange (LE) 9 side is the same as the sequence of <1> ordinary call and <3> "very important phone" (VIP) call mentioned above.

<5> "Very important phone" (VIP) Call

This mode relates to a situation wherein, in the above modes <1> to <4>, there is no free pre-connected call and no free overflow call (general call) which had been placed by diverting use of a pre-connected call.

Under such a situation, in the access network (AN), an ordinary time slot (TS) for a general call other than of the pre-connected channel (CH) is allocated, a general call is selected from among the plurality of general calls in process by a predetermined criteria, and this selected call is compulsorily disconnected (refer to SIGNAL [standby-signal] →DISC→ DEALLOCATION→ DEALLOCATION COMP. in the column of <5> in the figure). The criteria of selection here is, as an example, a call having the oldest usage start time. This usage start time is also one of the matters which is ordinarily monitored.

After this, the connection request (ESTABLISH) of the "very important phone" (VIP) call using the time slot (TS) whose call has been compulsorily disconnected is sent to the local exchange (LE) 9 side to request the allocation of the time slot (TS) (ALLOCATION).

The above operation is carried out in the access network (AN) in the figure and, more concretely, can be carried out by the pre-connected channel control unit 33 in the access control apparatus (AC) 13 shown in FIG. 1.

In conclusion, this seventh embodiment is characterized in the provision of a pre-connected channel control unit 33 provided with a facility of sending a connection request (ESTABLISH (pre-connected channel)) for allocating a time slot (TS) for the pre-connected channel (CH) to the local exchange (LE) 9 with respect to an overflow call for which allocation of a time slot (TS) has been rejected among the general calls.

This pre-connected channel control unit 33 is also provided with the facilities of the columns <4> and <5> of FIG. 23. Namely <4> the pre-connected channel control unit 33 transmits, at the time of congestion and when there is a call origination request for a "very important phone" call and further if there is a pre-connected call obtained by allocating an overflow call to the time slot for a pre-connected call, a request of disconnection for the above pre-connected call to the local exchange (LE) 9 and assigns the related "very important phone" (VIP) call.

<5> The pre-connected channel control unit 33 further has a facility of allocating a time slot (TS) obtained by disconnecting a general call selected by predetermined criteria to a related overflow call or a "very important phone" (VIP) call when a pre-connected call diverted in use to an overflow call or the "very important phone" (VIP) call cannot be captured.

Further, according to this seventh embodiment, as described above, the following call processing method is proposed. Namely, this is a method in which, when an overflow call is generated due to channel congestion, the access control apparatus (AC) 13 receives a dial number train after the sending of the dial tone is stopped and transmits the request for connection (ESTABLISH) to the local exchange (LE) 9, the message for requesting a connection including information indicating the request of usage of the pre-connected call for which a time slot (TS) for the pre-connected channel (CH) is allocated, is sent, and a pre-connected call is diverted for use to an overflow call.

The next method is further proposed.

This is a method of compulsorily disconnecting a pre-connected call diverted in use for an overflow call and allocating this time slot to a "very important phone" (VIP) call where a "very important phone" (VIP) call is generated at the time of channel congestion.

Further, a method of compulsorily disconnecting a general call selected from among a plurality of general calls by a predetermined criteria and allocating the time slot to a "very important phone" (VIP) call when a pre-connected call for allocation to the "very important phone" (VIP) call cannot be captured at the time of channel congestion is proposed.

According to the above seventh embodiment, an overflow call among general calls for which connection has been rejected can be relieved by a pre-connected call. Further, when a "very important phone" (VIP) call is generated, a pre-connected call used for an overflow call can be compulsorily changed to the "very important phone" (VIP) call. Further, when there are no pre-connected calls, a general call can be compulsorily disconnected to relieve the "very important phone" (VIP) call.

Figure 24:
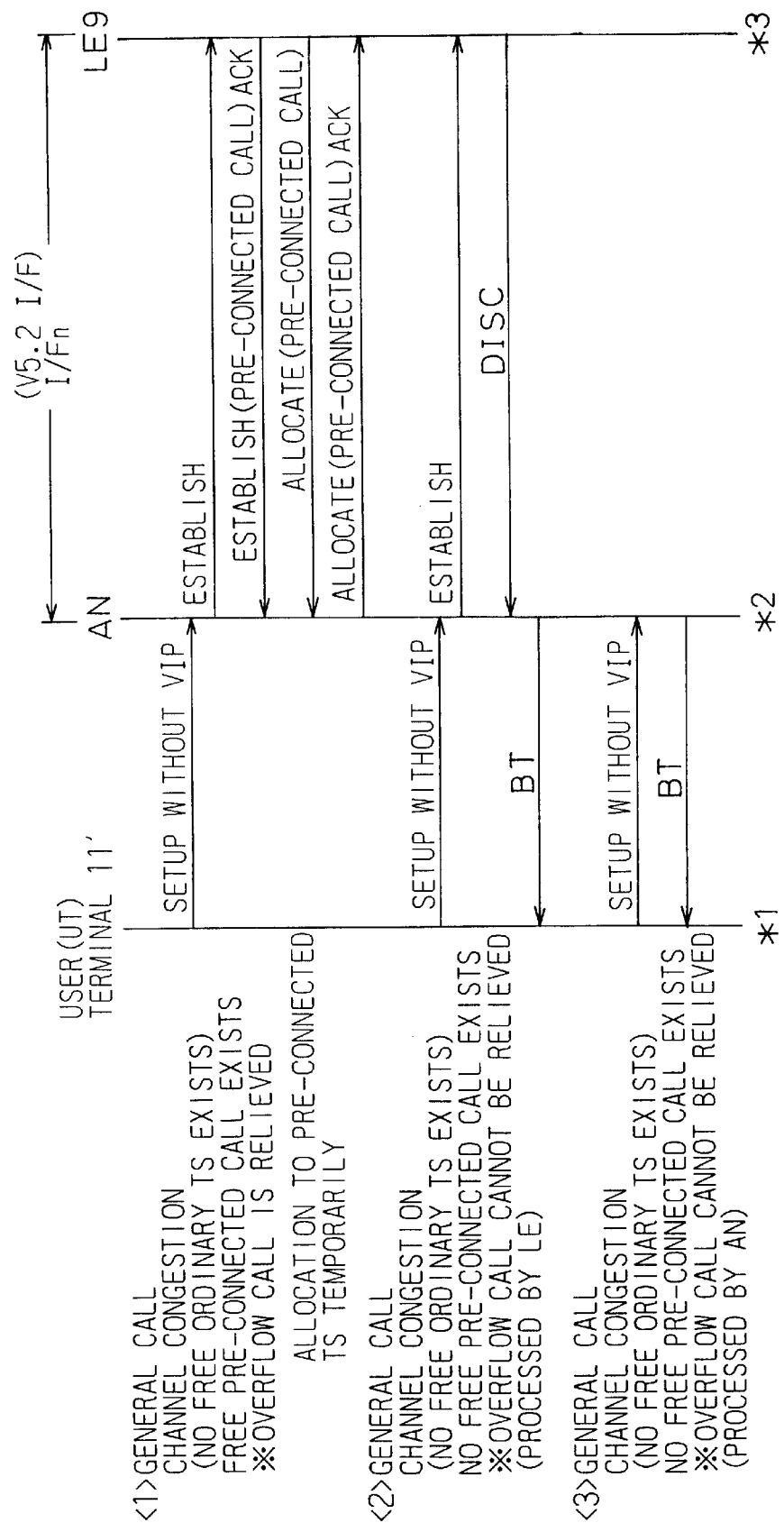
FIG. 24 is a first part of a sequence diagram representing a modification of the seventh embodiment.
Figure 25:
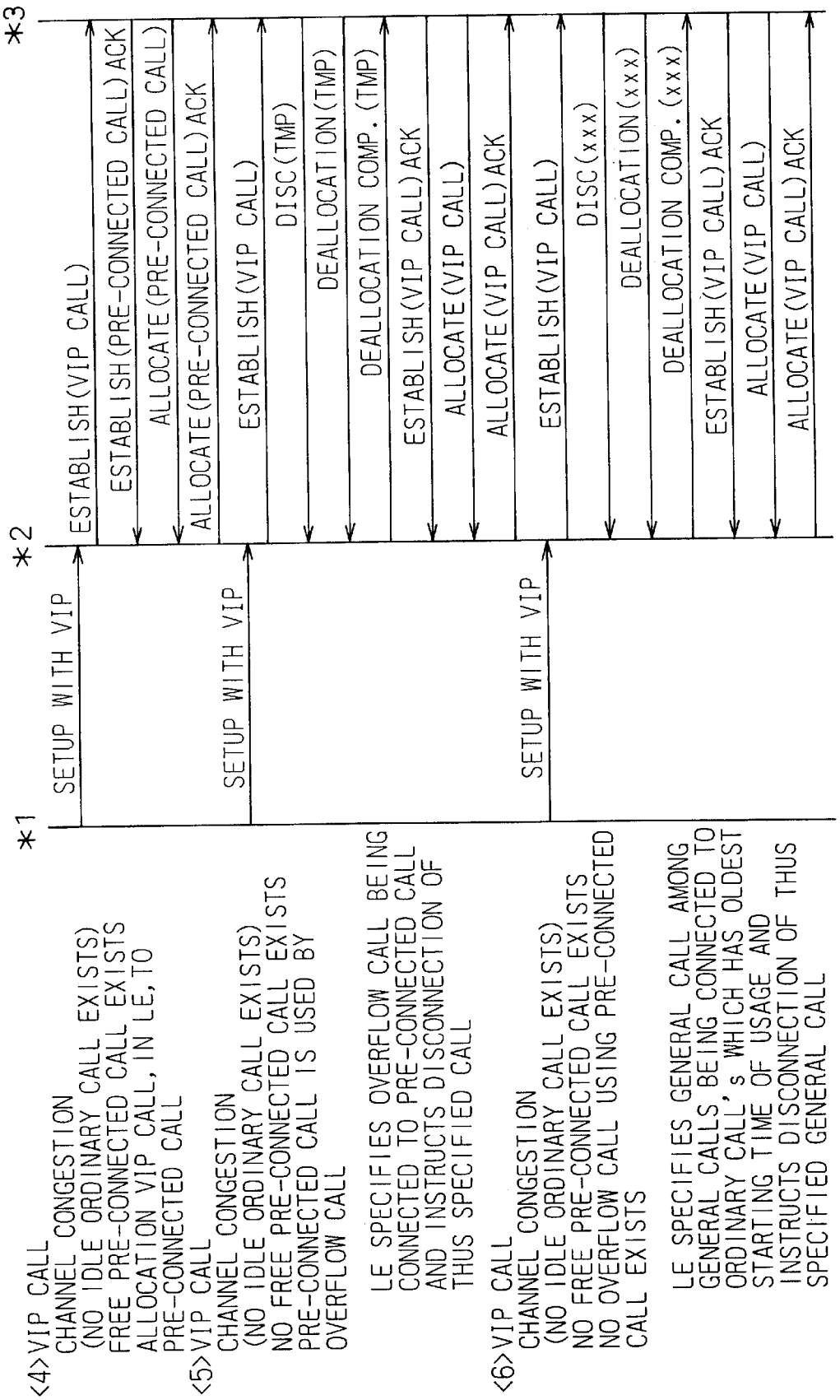
FIG. 25 is a second part of a sequence diagram representing a modification of the seventh embodiment.

FIG. 24 and FIG. 25 are first and second parts of a sequence diagram showing a modification of the seventh embodiment.

In the seventh embodiment represented in FIG. 22 and FIG. 23, the connection processing with respect to a "very important phone" (VIP) call or overflow call at the time of channel congestion was carried out on the access network (AN) side, for example, the pre-connected channel control unit 33 of FIG. 1 as a typical example, but similar connection processing can be carried out by the local exchange (LE) 9 side too. FIG. 24 and FIG. 25 show a sequence where the connection processing is carried out by the local exchange (LE) 9 side Accordingly, as a result, a similar effect to that of the case of the seventh embodiment mentioned before is obtained.

Figure 26:
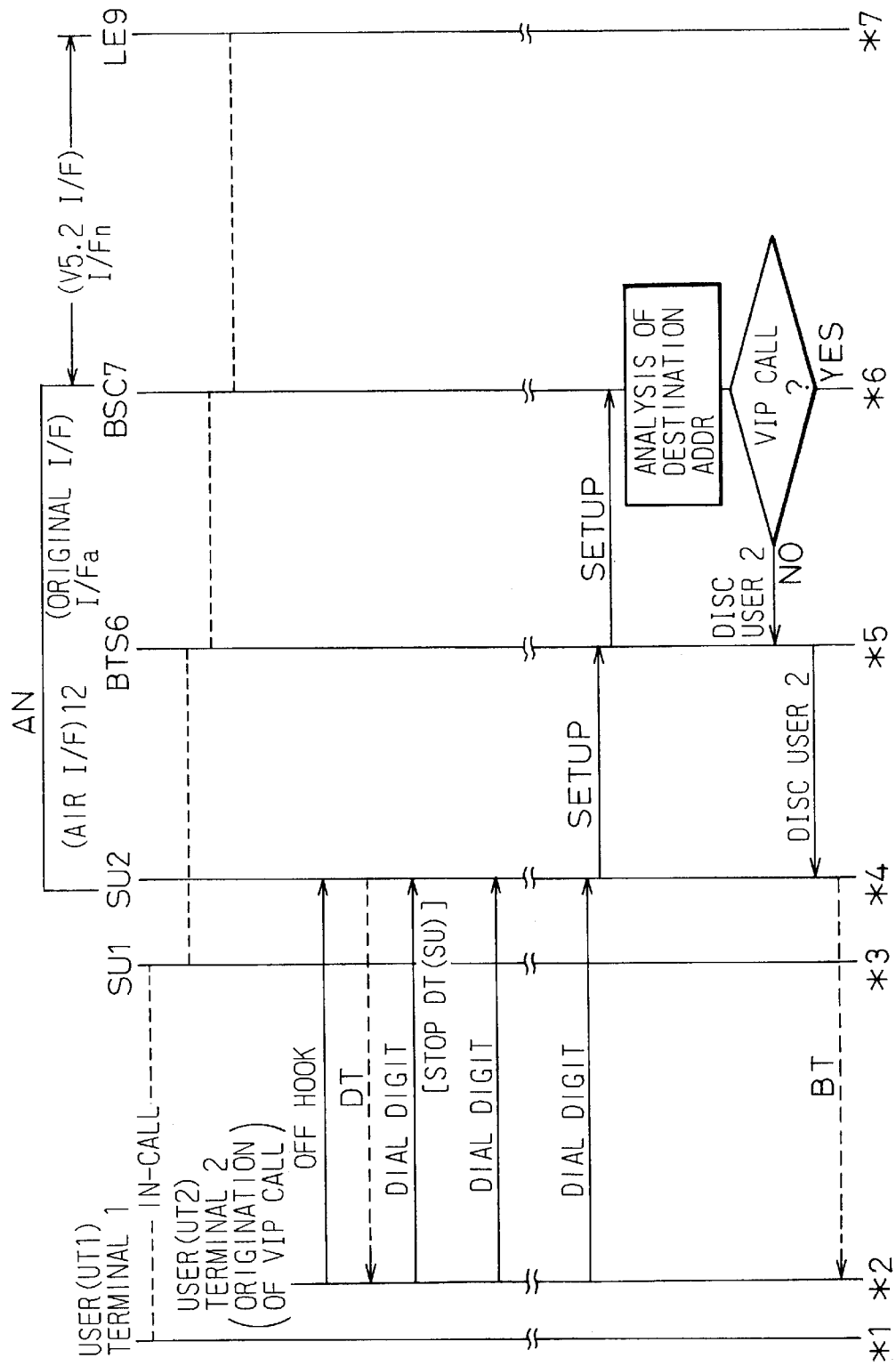
FIG. 26 is a first part of a sequence diagram showing a call origination mode based on an eighth embodiment.
Figure 27:
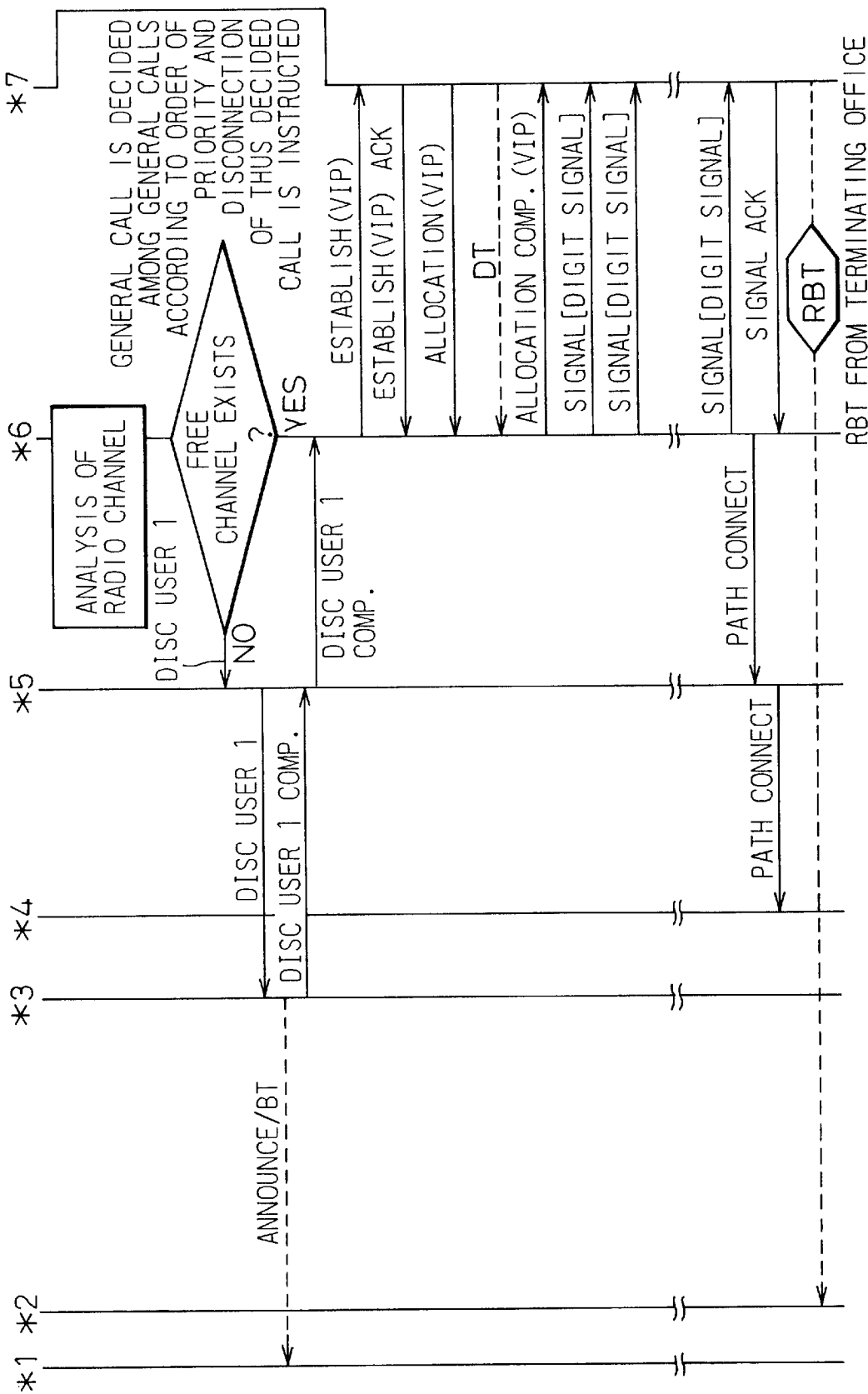
FIG. 27 is a second part of a sequence diagram showing a call origination mode based on the eighth embodiment.

FIG. 26 and FIG. 27 are first and second parts of a sequence diagram showing a call origination mode based on the eighth embodiment.

This eighth embodiment is an embodiment stressing the above problem (4). The point of the call origination mode in this embodiment resides in that rejection of the connection of a "very important phone" (VIP) call due to the congestion of traffic in the radio channel at the radio section 12 of FIG. 1 is avoided.

Referring to FIG. 26 and FIG. 27, the sequence represented in FIG. 26 is almost the same as for example the former half of FIG. 17 (fifth embodiment) and the "very important phone" (VIP) call processing unit 32 in the access control apparatus (AC) 13 of FIG. 1 operates for this purpose. In this FIG. 26 (and FIG. 27), unlike the sequence diagrams heretofore, two user terminals (UT) are shown as UT1 and UT2 and two subscriber units are shown as SU1 and SU2 as well accompanied with this.

In such a case, the "very important phone" (VIP) call processing unit 32 rejects the connection from the user terminal UT2, which is not originating a call using a "very important phone" (VIP) call as represented in the lower end part of FIG. 26, if the user terminal UT2 using a general call originates a call during a call of the user terminal UT1 using a general call, and sends a busy tone (BT) to the user terminal UT2.

However, if the originating call of the user terminal UT2 is a "very important phone" (VIP) call, the sequence shifts to FIG. 27 and the analysis of the radio channel (CH) is carried out at first. Then, the determination of whether or not there is a free radio channel is carried out.

Where there is no free channel, the origination of the related "very important phone" (VIP) call is rejected, and therefore a general call is selected from among a plurality of general calls with a predetermined order of priority and this selected general call, for example, the call by the user terminal UT1, is compulsorily disconnected and the procedure of capturing the "very important phone" (VIP) call by the user terminal UT2 is entered. Note that, to the user terminal UT1 whose call has been compulsorily disconnected is sent with an announcement such as "We are disconnecting this call due to an emergency situation" or a busy tone.

Thus, the process enters into the connection sequence of the "very important phone" (VIP) call by the user terminal UT2. The start of this is the transmission of the connection request "ESTABLISH (VIP)" in the figure to the local exchange (LE) 9. The sequence after this is exactly the same as the sequence shown in for example FIG. 17 (fifth embodiment).

At the time of the above disconnection of the call by the user terminal UT1, the call is disconnected according to a predetermined order of priority. As the priority order, it is also possible to give the highest priority to a general call having the longest channel usage time or determine the order thereof in advance for every user.

The above operation can be carried out by the radio channel establishing unit 34 in the access control apparatus (AC) 13 shown in FIG. 1.

In conclusion, this eighth embodiment is characterized in the provision of a radio channel establishing unit 34 for compulsorily disconnecting a general call selected from among a plurality of general calls by a predetermined order of priority when a plurality of originating calls of the user terminal (UT) 11' using a radio channel at the radio section 12 conflict and one of the originating calls is a "very important phone" (VIP) call, and sending a connection request (ESTABLISH (VIP)) accompanied with the indication of a "very important phone" (VIP) call to the local exchange (LE) 9 for the related "very important phone" (VIP) call.

Further, according to the eighth embodiment, the following call processing method is proposed, as mentioned before.

This is a method in which, when the access control apparatus (AC) 13 allocates a radio channel at the radio section 12 to the related originating call by receiving a dial number train after the output of the dial tone is stopped, it is determined whether or not there is a free channel in the radio channels, and if there is no free channel by this determination, one of a plurality of general calls using the radio channel is selected with a predetermined order of priority and the selected related general call is compulsorily disconnected, thereby to capture the radio channel for the "very important phone" (VIP) call.

According to the above eighth embodiment, the rejection of origination of a "very important phone" (VIP) call due to the channel congestion at the radio section 12 can be avoided.

Figure 28:
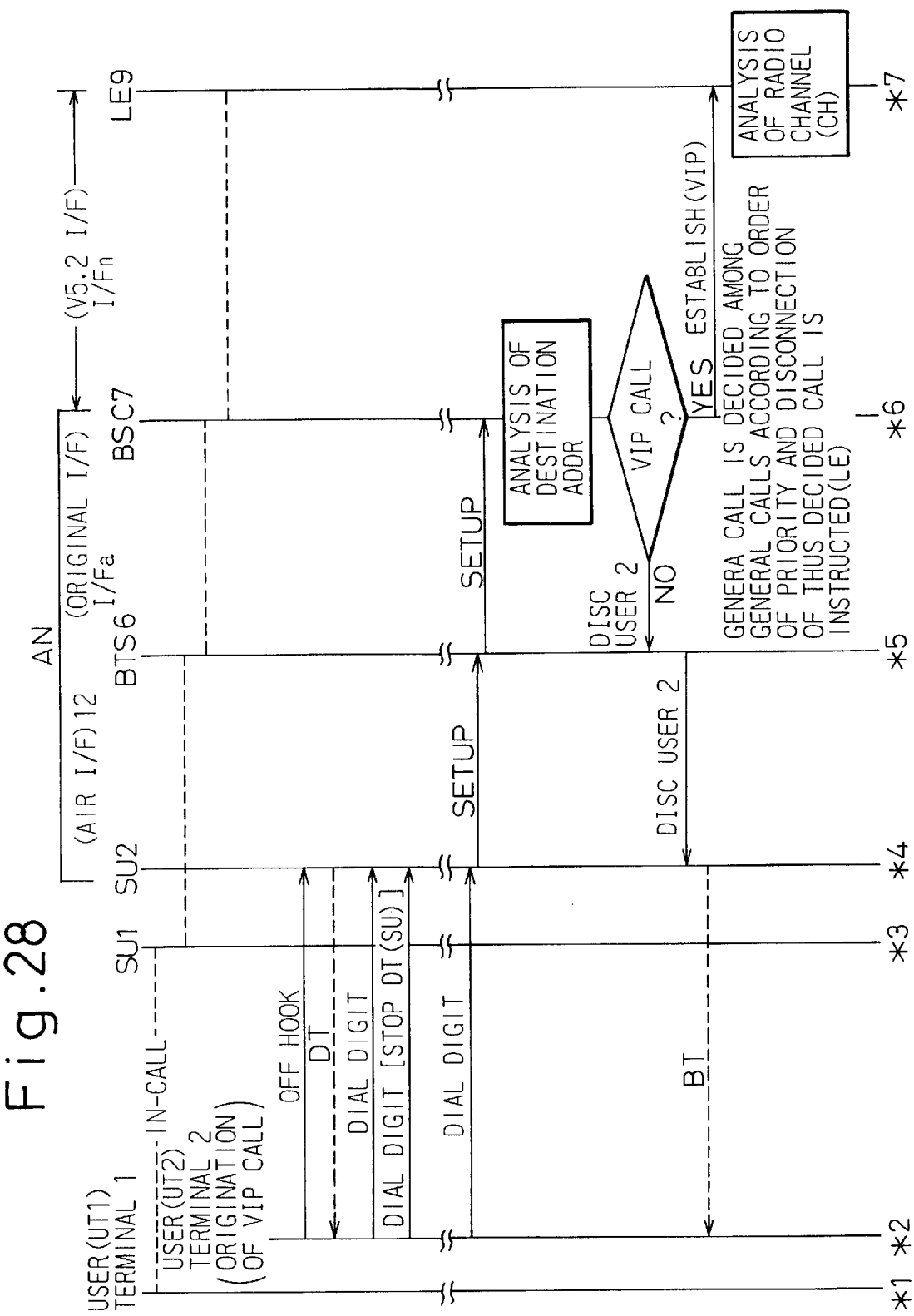
FIG. 28 is a first part of a sequence diagram showing a modification of the eighth embodiment.
Figure 29:
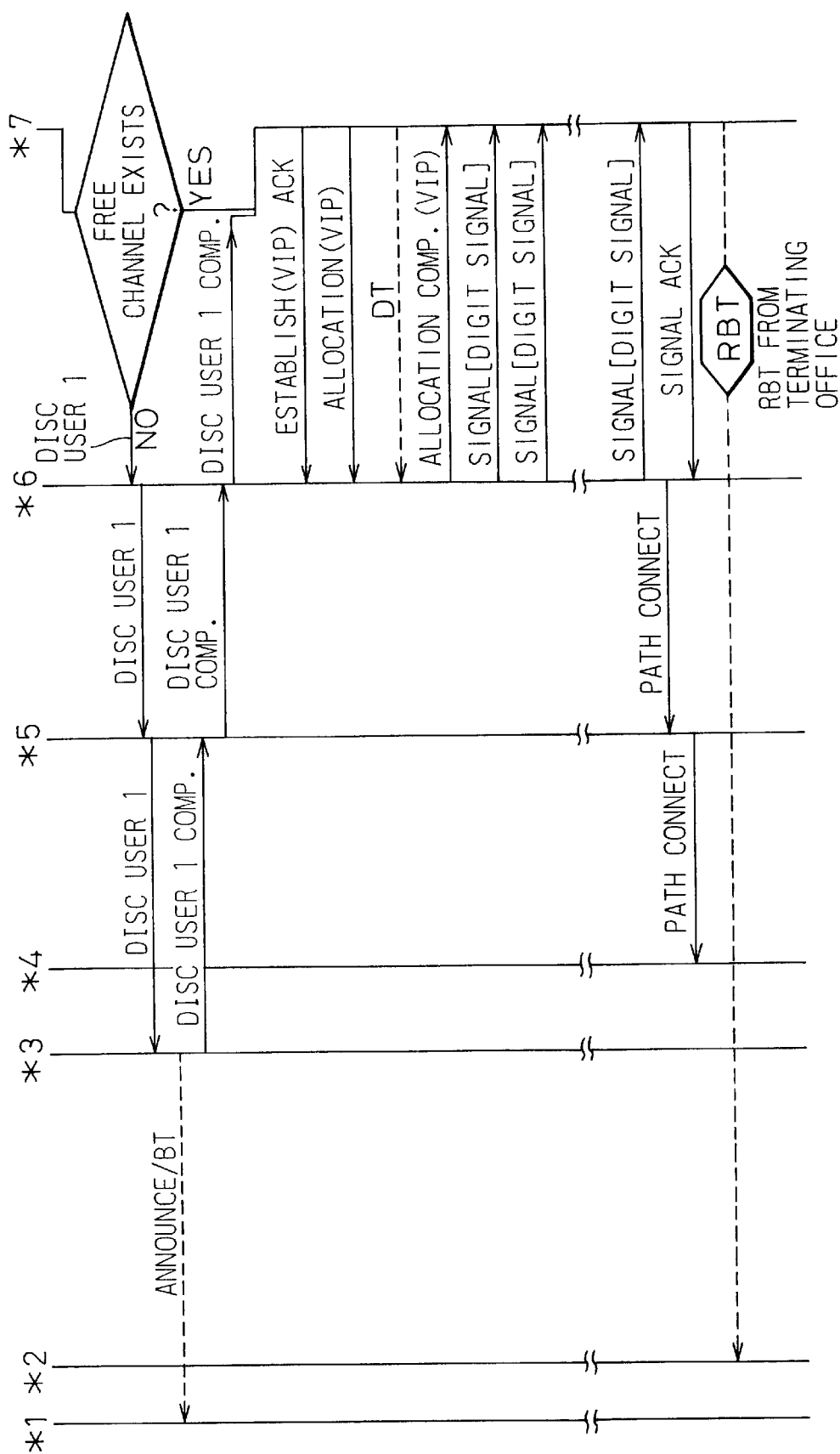
FIG. 29 is a second part of a sequence diagram showing a modification of the eighth embodiment.

FIG. 28 and FIG. 29 are first and second parts of a sequence diagram showing a modification of the eighth embodiment.

In the eighth embodiment represented in FIG. 26 and FIG. 27, the connection processing in the radio channel for a "very important phone" (VIP) call during the channel congestion was carried out by the access network (AN) side, for example, the radio channel establishing unit 34 of FIG. 1, but it is also possible to perform similar connection processing by the local exchange (LE) 9 side for example. FIG. 28 and FIG. 29 show a sequence where the connection processing is carried out by the local exchange (LE) side in this way. Accordingly, as a result, a similar effect to that by the case of the eighth embodiment can be obtained.

According to the embodiments mentioned in detail above, the following effects are obtained.

(1) The control such as the generation of the dial tone to the user terminal (UT) 11' and send/stop of the dial tone (DT) is carried out by the subscriber unit (SU) close to this, therefore the control is simplified.

(2) By processing a dial number train by the SETUP command as a package, the control traffic in the access network (AN) can be reduced. Further, along with this, the time during which the access control apparatus 13, particularly base station controller (BSC) 7 in the access network (AN), is occupied, is shortened and quick call processing can be carried out.

(3) By concentrating all of the sources of issuance of commands such as call origination commands to the local exchange (LE) 9 and commands to the subscriber unit (SU) 11 to the access control apparatus (AC) 13, especially the base station controller (BSC) 7, a system configuration which can be easily understood by a system designer or person performing the maintenance can be exhibited.

(4) By forming the path connection to the user terminal (UT) 11' immediately after the sending of the signal message (SIGNAL) originated to the local exchange (LE), during the standby for connection of a call from the user terminal (UT) to the opposing user terminal (UT), the original dial tone (DT) can be prevented from being heard from the local exchange (LE) 9 without missing the beginning of the general announcement which is sometimes made after the dialing.

(5) Even if a disconnection message is once returned from the local exchange (LE) 9 due to channel congestion, if the originating call is a "very important phone" (VIP) call, it can be relieved.

(6) If the decision of whether or not the related originating call is a "very important phone" (VIP) call is performed immediately after the dial digits are entirely received, a "very important phone" (VIP) call at the time of channel congestion can be quickly relieved.

(7) An overflow call for which connection has been rejected among the general calls can be relieved by a pre-connected call. Further, when a "very important phone" (VIP) call is generated, a pre-connected call used for an overflow call can be compulsorily changed to the "very important phone" (VIP) call. Further, when there is no free pre-connected call, the "very important phone" (VIP) call can be relieved by compulsorily disconnecting a general call.

(8) Rejection of the origination of a "very important phone" (VIP) call can be avoided even during channel congestion of the radio channels in the radio section 12.

What is claimed is:

1. A call processing method, in a wireless local loop system having an access control apparatus connected to a local exchange of a public switched telephone network via an inter-network interface, having a subscriber unit connected to the access control apparatus via a radio connection and having a user terminal directly connected to the subscriber unit, comprising the steps of:

(a) when the user terminal is activated, a dial tone is generated by and output from the subscriber unit, instead of said local exchange, to the user terminal; and (b) after step (a), when the user inputs a first dial digit, the output of the dial tone is stopped, wherein said dial tone is sent by a send command which is issued by said access control apparatus detecting the activation, the send command being transmitted to said subscriber unit, and said dial tone being sent is stopped by a stop command which is issued by said access control apparatus, the stop command being transmitted to said subscriber unit, after the access control apparatus detects said first dial digit originated from said user terminal.

2. A call processing method according to claim 1, wherein said subscriber unit stores the first dial digit and dial digits sequentially originated subsequent to the first dial digit as a number train and originates the number train to said local exchange together with a message indicating that the number train has been sent as a package.

3. A call processing method according to claim 2, wherein a path connection to said subscriber unit is formed during a term from when the first dial digit is originated from said user terminal and the dial tone from said local exchange is stopped to immediately after the last dial digit is originated from the user terminal.

4. A call processing method according to claim 2, having:

a step of receiving and analyzing said first dial digit and a dial number train sequentially originated subsequent to this and performing a decision of whether the related originating call is a general call or a VIP call and a step of sending a request for connection (ESTABLISH (INF)) accompanied by information indicating the result of the decision to said local exchange.

5. A call processing method according to claim 1, wherein a path connection to said subscriber unit is formed during a term from when the first dial digit is originated from said user terminal and the dial tone from said local exchange is stopped to immediately after the last dial digit is originated from the user terminal.

6. A call processing method according to claim 1, wherein a path connection between said subscriber unit and said access control apparatus is formed during a term from when the first dial digit is originated from said user terminal and the dial tone from said local exchange is stopped to immediately after the last dial digit is originated from the user terminal.

7. A call processing method according to claim 1, having:

a step of sending a request for connection (ESTABLISH) to said local exchange by the origination of said first dial digit;

a step of analyzing a dial number train originated subsequent to the first dial digit where a disconnection message (DISC) is returned with respect to said connection request and determining whether this corresponds to a predetermined "very important phone" (VIP) call; and a step of sending a request for connection (ESTABLISH (VIP)) indicating that the related call is a VIP call again if it is a VIP call, while transferring said disconnection message to said subscriber unit as it is if it is not a VIP call.

8. A call processing method according to claim 1, wherein when an overflow call is generated due to channel congestion, said access control apparatus receives a dial number train after the sending of said dial tone is stopped and sends a request for connection (ESTABLISH) to said local exchange, the message for requesting a connection including information indicating the request of usage of a pre-connected call to be allocated to a time slot for the pre-connected channel is sent, and the pre-connected call is diverted for use to said overflow call.

9. A call processing method according to claim 8, wherein a pre-connected call diverted in use to said overflow call is compulsorily disconnected and allocated to a VIP call when a VIP call is generated at the time of channel congestion.

10. A call processing method according to claim 9, wherein a general call selected from among a plurality of general calls by the predetermined criteria is compulsorily disconnected and its time slot is allocated to a VIP call when a pre-connected call for allocation to the VIP call cannot be captured at the time of channel congestion.

11. A call processing method according to claim 1, wherein:

when said access control apparatus allocates a radio channel in said radio section to a related originating call by receiving a dial number train after the output of said dial tone is stopped, it is determined whether or not there is a free channel in the radio channel;

if there is no free channel by this determination, one of a plurality of general calls using said radio channel is selected with a predetermined order of priority; and the selected related general call is compulsorily disconnected and said radio channel is captured for said VIP call.

12. A call processing method according to claim 1, wherein the user terminal is activated when the user terminal goes off hook.

13. A subscriber unit in a wireless local loop system having an access control apparatus connected to a local exchange of a public switched telephone network via an inter-network interface, having the subscriber unit connected to the access control apparatus via a radio connection and having a user terminal connected directly to the subscriber unit, comprising:

a dial tone reception guarantee device to guarantee reception of a dial tone by the user terminal, after activation thereof, irrespective of the conditions in said local exchange, the dial tone being generated by and output from the subscriber unit, instead of said local exchange, to said user terminal, upon receipt of a send command which is issued by the access control apparatus, the send command being transmitted to said subscriber unit, the dial tone being stopped upon receipt of a stop command which is issued by the access control apparatus, the stop command being transmitted to the subscriber unit when the access control apparatus detects the first dialed digit.

14. A subscriber unit according to claim 13, wherein said dial tone reception guarantee means has a dial tone generating unit which generates said dial tone when detecting activation, i.e., off-hook, and transmits this to said user terminal.

15. A subscriber unit according to claim 13, wherein said subscriber unit has a dial information originating unit for once storing the dial number train sequentially originated subsequent to said first dial digit and, at the same time, originating the dial number train to said local exchanger side as a package.

16. A subscriber unit according to claim 13, wherein the user terminal is activated when the user terminal goes off hook.

17. An access control apparatus in a wireless local loop system having the access control apparatus connected to a local exchange of a public switched telephone network via an inter-network interface, having a subscriber unit connected to the access control apparatus via a radio connection and having a user terminal connected to the subscriber unit, comprising:

a dial tone send/stop control unit which issues and transmits a send command to a dial tone generating unit in said subscriber unit, commanding the subscriber unit to generate a dial tone, instead of said local exchange, and output the dial tone to the user terminal, the send command being transmitted to said dial tone generating unit when a signal is received from the user terminal indicating activation, and which issues and transmits a stop command for stopping the dial tone to said dial tone generating unit when a first dial digit originated from the user terminal is detected.

18. An access control apparatus according to claim 17, wherein the user terminal is activated when the user terminal goes off hook.

19. An access control apparatus in a wireless local loop system having the access control apparatus connected to a local exchange of a public switched telephone network via an inter-network interface, having a subscriber unit connected to the access control apparatus via a radio connection and having a user terminal connected to the subscriber unit, comprising:

a path connection forming unit for forming a path connection to the user terminal in the period from when a first dial digit originated after the activation is received from the user terminal and a dial tone from said local exchange is stopped to when a last dial digit is received from the user terminal and a ringback tone is returned from the local exchange, said path connection being established not before said dial tone from said local exchange is stopped.

20. An access control apparatus according to claim 19, wherein said path connection forming unit forms the path connection to said user terminal immediately after sending of a signal message (SIGNAL) originated to said local exchange in response to said last dial digit.

21. An access control apparatus in a wireless local loop system having the access control apparatus connected to a local exchange of a public switched telephone network via an inter-network interface, having a subscriber unit connected to the access control apparatus via a radio connection and having a user terminal connected to the subscriber unit, comprising:

a VIP call processing unit activated when a disconnection message is returned from said local exchange with respect to a request for connection sent in response to activation of said user terminal, to analyze a dial number train originated from said user terminal and determine whether or not the dial number train relates to a VIP call, and if it does relate to a VIP call, sending a request for connection to said local exchange indicating that the dial number train relates to a VIP call, and if the dial number train does not relate to a VIP call, transferring said disconnection message to said subscriber unit.

22. An access control apparatus according to claim 21, further comprising:

a radio channel establishing unit to compulsorily disconnect a general call selected from among a plurality of general calls by a predetermined order of priority when a plurality of originating calls conflict and one of the originating calls is a VIP call and to send a request for connection identifying the VIP call as a VIP call.

23. An access control apparatus according to claim 21, wherein the user terminal is activated when the user terminal goes off hook.

24. An access control apparatus in a wireless local loop system having the access control apparatus connected to a local exchange of a public switched telephone network via an inter-network interface, having a subscriber unit connected to the access control apparatus via a radio connection and having a user terminal connected to the subscriber unit, comprising:

a VIP call processing unit to analyze a dial number train subsequent to activation by said user terminal, determine whether the dial number train relates to a general call or a VIP call, and send a request for connection to the local exchange containing an indication of the result of the determination.

25. An access control apparatus according to claim 24, wherein the user terminal is activated when the user terminal goes off hook.

26. An access control apparatus in a wireless local loop system having the access control apparatus connected to a local exchange of a public switched telephone network via an inter-network interface, having a subscriber unit connected to the access control apparatus via a radio connection and having a user terminal connected to the subscriber unit, comprising:

a pre-connected channel control unit to send a request for connection identifying a pre-connected channel to said local exchange when a time slot for the preconnected channel has been rejected, due to overflow at a time of channel congestion between the local exchange and the access control apparatus.

27. An access control apparatus according to claim 26, wherein said pre-connected channel control unit transmits, at the time of congestion and when there is a call origination request for a VIP call and further if there is a pre-connected call obtained by allocating an overflow call to the time slot for a pre-connected call, a request of disconnection for the above pre-connected call to the local exchange and assigns the related VIP call.

28. An access control apparatus according to claim 27, wherein said pre-connected channel control unit (33) further has a facility of allocating the time slot obtained by disconnecting a general call selected by a predetermined criteria to a related overflow call or a VIP call when a pre-connected call divertable to said overflow call or VIP call cannot be captured.

29. An access control apparatus in a wireless local loop system having a subscriber unit and an access control apparatus arranged between the subscriber unit and a local exchange of a public switched telephone network, the access control apparatus being connected to the subscriber unit via a radio connection and connected to said local exchange via an inter-network interface, comprising:

a dial tone send/stop control unit to issue and transmit a send command to the subscriber unit when the access control apparatus detects that the subscriber unit has been activated, the send command commanding the subscriber unit to generate and output a dial tone, instead of said local exchange, to a user, the dial tone send/stop control unit issuing and transmitting a stop command to the subscriber unit when the access control apparatus detects that the user has input the first dialed digit, the stop command commanding the subscriber unit to stop output of the dial tone to the user.

30. An access control apparatus according to claim 29 further comprising a VIP call processing unit activated when a disconnection message is returned from the local exchange with respect to a request for connection, to analyze a dialed number train and determine whether or not the dialed number train relates to a VIP call, and if the dialed number train does relate to a VIP call, send a request for connection to the local exchange indicating that the dialed number train relates to a VIP call.

31. An access control apparatus according to claim 29 further comprising a VIP call processing unit to analyze a dialed number train, determine whether the dialed number train relates to a general call or a VIP call, and send a request for connection to the local exchange containing an indication of the result of the determination.

32. An access control apparatus according to claim 29, further comprising a preconnected channel control unit operable when a time slot for a preconnected channel has been rejected due to overflow, to send a request for connection to the local exchange identifying the preconnected channel.

33. An access control apparatus according to claim 29, further comprising a radio channel establishing unit to compulsorily disconnect a general call selected from among a plurality of general calls by a predetermined order of priority, when a plurality of originating calls conflict and one of the originating calls is a VIP call, and to send a request for connection to local exchange identifying the VIP call as a VIP call.

34. An access control apparatus in a wireless local loop system having the access control apparatus connected to a local exchange of a public switched telephone network via an inter-network interface, having a subscriber unit connected to the access control apparatus via a radio connection and having a user terminal connected to the subscriber unit, the user terminal outputting a first dial digit after which a dial tone from the local exchange is stopped, the user terminal outputting a last dial digit after which a ringback tone is returned from the local exchange, comprising:

a path connection forming unit for forming a path connection to the user terminal in the period from when the dial tone from the local exchange is stopped to when ringback tone is returned from the local exchange.

* * * * *